US011879263B2

(12) United States Patent
Irvine

(10) Patent No.: US 11,879,263 B2
(45) Date of Patent: Jan. 23, 2024

(54) TAIL SWEEP SPRAY DIFFUSER FOR POOL CLEANER

(71) Applicant: ERUPTECH LLC, Atlanta, GA (US)

(72) Inventor: John Irvine, Atlanta, GA (US)

(73) Assignee: ERUPTECH LLC, Atlanta, GA (US)

( * ) Notice: Subject to any disclaimer, the term of this patent is extended or adjusted under 35 U.S.C. 154(b) by 1206 days.

(21) Appl. No.: 16/531,461

(22) Filed: Aug. 5, 2019

(65) Prior Publication Data

US 2020/0047196 A1 Feb. 13, 2020

Related U.S. Application Data

(60) Provisional application No. 62/717,540, filed on Aug. 10, 2018, provisional application No. 62/715,642, filed on Aug. 7, 2018.

(51) Int. Cl.

| | |
|---|---|
| ***B05B 3/04*** | (2006.01) |
| ***E04H 4/16*** | (2006.01) |
| ***B05B 1/26*** | (2006.01) |
| ***B05B 1/34*** | (2006.01) |

(52) U.S. Cl.

CPC ........... *E04H 4/1681* (2013.01); *B05B 1/262* (2013.01); *B05B 1/34* (2013.01); *B05B 3/0486* (2013.01); *E04H 4/169* (2013.01)

(58) Field of Classification Search

CPC ....... E04H 4/1654; E04H 4/1681; E04H 4/16; E04H 4/1663; A46B 13/06; A46B 2200/3073; B05B 1/262; B05B 1/34; B05B 3/0486; B08B 1/00

See application file for complete search history.

(56) References Cited

U.S. PATENT DOCUMENTS

| | | | | |
|---|---|---|---|---|
| 2,766,026 | A | 10/1956 | Boyd | |
| 3,776,464 | A | 12/1973 | Proffit | |
| 3,872,533 | A * | 3/1975 | Proffit | B05B 3/0427 15/387 |
| 4,356,582 | A | 11/1982 | Stephenson | |
| 4,651,377 | A | 3/1987 | Staples | |
| 5,901,906 | A | 5/1999 | Bouldin | |
| 5,996,906 | A | 12/1999 | Cooper | |
| 6,029,290 | A | 2/2000 | Butcher et al. | |
| 7,402,242 | B2 | 7/2008 | Duckett | |
| 8,037,567 | B1 * | 10/2011 | Harris | B24D 13/04 451/295 |
| D654,989 | S | 2/2012 | Bloink et al. | |

(Continued)

FOREIGN PATENT DOCUMENTS

| | | | |
|---|---|---|---|
| CA | 2830963 | A1 | 10/2012 |
| WO | 2012138412 | A1 | 10/2012 |
| WO | 2014071403 | A1 | 5/2014 |

*Primary Examiner* — Christopher R Dandridge

(74) *Attorney, Agent, or Firm* — GARDNER GROFF & GREENWALD, PC

(57) ABSTRACT

A spray diffuser for a pool cleaner is coupled to the end of the tail sweep hose which expels pressurized water out of the end of the hose. The diffuser includes a flow shaping nozzle configured to form a diverging pressurized water stream. The shaping nozzle can be attached directly to the end of the hose with a flow obstruction of the shaping nozzle immediately adjacent the flow discharge. A dissipating portion dissipates the pressurized water stream when the spray diffuser is positioned above the surface of the water to prevent water spraying out of the pool.

28 Claims, 12 Drawing Sheets

(56) References Cited

U.S. PATENT DOCUMENTS

| | | | | |
|---|---|---|---|---|
| D657,027 | S | 4/2012 | Bloink et al. | |
| 8,241,506 | B1 | 8/2012 | Vernier et al. | |
| 9,249,590 | B2 | 2/2016 | Bloink et al. | |
| 9,938,744 | B2 | 4/2018 | Gopalan et al. | |
| 2010/0011521 | A1 | 1/2010 | Collins | |
| 2017/0298645 | A1* | 10/2017 | Checri .................. | A46B 13/06 |

* cited by examiner

TAIL SWEEP SPRAY DIFFUSER FOR POOL CLEANER

CROSS-REFERENCE TO RELATED APPLICATION

This application claims the benefit of U.S. Provisional Patent Application Ser. No. 62/715,642 filed Aug. 7, 2018 and U.S. Provisional Patent Application Ser. No. 62/717,540 filed Aug. 10, 2018, the entireties of which are hereby incorporated herein by reference for all purposes.

TECHNICAL FIELD

The present invention relates generally to the field of fluid diffusers, and more particularly to tail sweep spray diffusers for pool cleaners.

BACKGROUND

Automatic swimming pool cleaners move along the floor and sidewalls of the pool to vacuum debris from the floor and side walls, as well as agitate and suspend fine particles so they move through the pool filter system. The cleaners generally include a tail sweep hose that trails behind the cleaner whipping from side to side to agitate and suspend the debris. In some devices, a replaceable scrubber cover can optionally be attached to the tail sweep. Contact with the pool floor and sidewall surfaces commonly causes abrasive wear of tail sweep parts and scrubber covers, often necessitating frequent replacement.

The whipping action of the tail sweep generally results from the stream of water exiting the end of the tail sweep hose under significant pressure. If the end of the hose is positioned above the water surface, the water stream exiting the end of the hose can project a significant distance which can soak the area surrounding the pool including the pool deck, pool furniture, adjacent structures, landscaping, artwork, and people enjoying the pool area. A diffuser having a deflector or diverter can be attached to the end of the hose to deflect the water stream if the end of the hose breaks the surface of the water. Previously known deflectors/diverters for tail sweep pool cleaners have, however, proven unsatisfactory in certain regards. For example, some known scrubbers include a foam cover configured to be fitted over a tail sweep to serve as a flow diffuser. The foam scrubber moves along the abrasive bottom and sides of the pool causing it to wear quickly and need to be replaced frequently. Further, while the foam scrubber is usually circular and surrounds the deflector, the scrubber tends to wear unevenly which contributes to a limited lifespan of the scrubber.

Wear from friction against pool surfaces can also cause detachment of flow deflecting nozzles or diffusers of a pool cleaner tail sweep, further contributing to undesirable spraying above the water surface. For example, flow deflectors having flexible clips or flanges for attachment to an existing pool cleaner tail sweep hose may be prone to disengagement from the nozzle, especially if the nozzle is worn due to abrasion. Also, misalignment of a flow deflector on the nozzle, for example due to abrasive wear on connecting parts, can cause the water stream exiting the hose to miss the flow obstruction of a tail sweep diffuser or diverter nozzle, allowing spray of pressurized water to shoot out of the pool. In some known tail sweep devices, the flow obstruction is positioned a significant distance from the end of the tail sweep hose, causing the water stream to miss the flow obstruction in the event of even a small misalignment of the tail sweep nozzle.

Some known tail sweep flow deflector nozzles also include openings that function as entrances for ambient fluid to create a pressure differential causing water or air to be drawn into the deflector housing. In some known devices, these openings are small and can plug with debris from the ambient fluid, restricting the water flow and reducing tail sweep whipping action. Such devices are particularly prone to clogging with debris when a flow deflector nozzle is used without a foam scrubber cover.

Accordingly, it can be seen that needs exist for improved tail sweep spray diffusers for pool cleaners. It is to the provision of improved tail sweep spray diffusers for pool cleaners meeting these and other needs that the present invention is primarily directed.

SUMMARY

In example embodiments of the present invention, an improved pool cleaner tail sweep nozzle or diffuser is provided. Various embodiments may provide improved cleaning performance, greater durability for longer product life, and/or improved flow diversion/diffusion to prevent or substantially reduce spraying above the water surface. The diffuser is coupled to the end of the tail sweep hose which expels a stream of pressurized water. The diffuser generally includes a shaping nozzle configured to form an at least partially hollow cone of pressurized water stream. The shaping nozzle can be attached directly to the end of the hose. The diffuser can also include a dissipating portion configured to dissipate the at least partially hollow cone of the pressurized water stream when the spray diffuser is positioned above the surface of the water. The diffuser can optionally include a cover configured to fit over the dissipating portion of the diffuser.

In one aspect, the invention relates to a diffuser for a pool cleaner tail sweep. The diffuser preferably includes a flow shaping nozzle having a first end having an inlet opening for receiving an inlet stream of pressurized water from the pool cleaner tail sweep, a second end having an outlet opening for discharging an outlet stream of pressurized water, a fluid conduit extending from the inlet opening to the outlet opening, and an obstruction in the path of the outlet stream of pressurized water. The obstruction is preferably configured to shape the outlet stream of pressurized water into an at least partially diverging flow pattern. The diffuser preferably also includes a dissipating portion including a chamber into which the flow shaping nozzle discharges the at least partially diverging flow pattern. The dissipating portion preferably includes at least one dissipation element and a fluid discharge opening. The diffuser preferably operates in a first mode when submerged in a pool of water beneath a water surface, whereby the at least partially diverging flow pattern is directed through the fluid discharge opening of the dissipating portion in a concentrated stream in the first mode of operation when submerged in a pool of water beneath a water surface. The diffuser preferably also operates in a second mode when positioned above the water surface, whereby the at least partially diverging flow pattern is directed to the at least one dissipation element of the dissipating portion to form a diffuse stream in the second mode of operation when positioned above the water surface.

In another aspect, the invention relates to a diffuser for a pool cleaner having a tail sweep hose. The diffuser preferably includes a flow shaping nozzle configured for attachment to an end of the tail sweep hose. The flow shaping nozzle preferably has a first end including an inlet opening for receiving an inlet stream of pressurized water from the tail sweep hose, a second end including an outlet opening for discharging an outlet stream of pressurized water, a fluid conduit extending from the inlet opening to the outlet opening, and an obstruction in the path of the outlet stream of pressurized water. The obstruction is preferably configured to shape the outlet stream of pressurized water into an at least partially diverging flow pattern, and the obstruction is positioned immediately adjacent the end of the tail sweep hose when the flow shaping nozzle is attached to the end of the tail sweep hose. The diffuser preferably also includes a dissipating portion including a chamber into which the flow shaping nozzle discharges the at least partially diverging flow pattern. The dissipating portion preferably also includes at least one dissipation element, and a fluid discharge opening.

In still another aspect, the invention relates to a a diffuser for a pool cleaner having a tail sweep hose. The diffuser preferably includes a flow shaping nozzle configured for engagement with an end of the tail sweep hose. The flow shaping nozzle preferably has a first end including an inlet opening for receiving an inlet stream of pressurized water from the tail sweep hose, a second end including an outlet opening for discharging an outlet stream of pressurized water, a fluid conduit extending from the inlet opening to the outlet opening, and an obstruction in the path of the outlet stream of pressurized water. The obstruction is preferably configured to shape the outlet stream of pressurized water into an at least partially diverging flow pattern, and the obstruction is preferably positioned no more than about 1" from the end of the tail sweep hose when the flow shaping nozzle is attached to the end of the tail sweep hose. The diffuser preferably also includes a dissipating portion including a chamber into which the flow shaping nozzle discharges the at least partially diverging flow pattern. The dissipating portion preferably also includes a generally hollow body having at least one sidewall and a plurality of openings in the at least one sidewall of the hollow body.

In another aspect, the invention relates to a diffuser for a pool cleaner tail sweep. The diffuser preferably includes a flow shaping nozzle having a first end including an inlet opening for receiving an inlet stream of pressurized water from the tail sweep hose, a second end including an outlet opening for discharging an outlet stream of pressurized water, a fluid conduit extending from the inlet opening to the outlet opening, and an obstruction in the path of the outlet stream of pressurized water. The obstruction is preferably configured to shape the outlet stream of pressurized water into an at least partially diverging flow pattern. The diffuser preferably also includes a dissipating portion including a chamber into which the flow shaping nozzle discharges the at least partially diverging flow pattern. The dissipating portion preferably operates with a spinning motion relative to the flow shaping nozzle, the spinning motion being rotational about an axis generally aligned with the outlet stream of pressurized water from the flow shaping nozzle.

In yet another aspect, the invention relates to a spray diffuser for a tail sweep pool cleaner comprising a hose that expels pressurized water out of an end of the hose, the spray diffuser comprising a shaping nozzle having a first end and a second end, wherein the first end is configured for attachment to the end of the hose and wherein the second end is configured to form an at least partially hollow cone of pressurized water stream, and a dissipating portion configured to dissipate the at least partially hollow cone of pressurized water stream when the spray diffuser is above a water surface.

In another aspect, the invention relates to a spray diffuser for a tail sweep pool cleaner comprising a hose that expels pressurized water from an opening at the end of the hose, the spray diffuser comprising a shaping nozzle configured for attachment to the end of the hose, the shaping nozzle comprising an opening and an obstruction positioned within or directly above the opening, wherein the opening in the shaping nozzle is positioned in front of the opening in the hose, and wherein the obstruction is a distance of no more than 1 inch from the opening in the hose.

In other example embodiments, a spinning diffuser for a tail sweep pool cleaner is provided. The diffuser is coupled to the end of the tail sweep hose which expels pressurized water out of the end of the hose. The spinning diffuser generally includes a shaping nozzle configured to form an at least partially hollow cone of pressurized water stream. The shaping nozzle can be attached directly to the end of the hose. The diffuser can also include a dissipating portion configured to dissipate the at least partially hollow cone of pressurized water stream when the diffuser is positioned above the surface of the water. The dissipating portion is generally free to rotate about the end of the hose. In example embodiments, the dissipating portion includes a spinning feature that causes the dissipating portion to spin when it is in use.

In another aspect, the present invention relates to a spinning diffuser for a tail sweep pool cleaner comprising a hose that expels a pressurized water stream out of an end of the hose, the spinning diffuser comprising a shaping nozzle having a first end and a second end, wherein the first end is configured for attachment to the end of the hose and wherein the second end is configured to form an at least partially hollow cone of pressurized water stream, and a dissipating portion configured to dissipate the at least partially hollow cone of the pressurized water stream when the spray diffuser is above a water surface, wherein the dissipating portion is coupled to the hose and is able to rotate about the hose, wherein the dissipating portion further comprises a spinning component configured to impart a rotational motion to the dissipating portion when it is in use.

In another aspect, the invention relates to a spinning diffuser for a tail sweep pool cleaner comprising a hose that expels pressurized water from an opening at the end of the hose, the spinning diffuser comprising a shaping nozzle configured for attachment to the end of the hose, the shaping nozzle comprising an opening and an impediment positioned within or directly above the opening, and a spinning portion that surrounds the shaping nozzle, wherein the spinning portion is configured to rotate about the end of the hose and wherein the rotational motion is driven by the action of the tail sweep pool cleaner.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
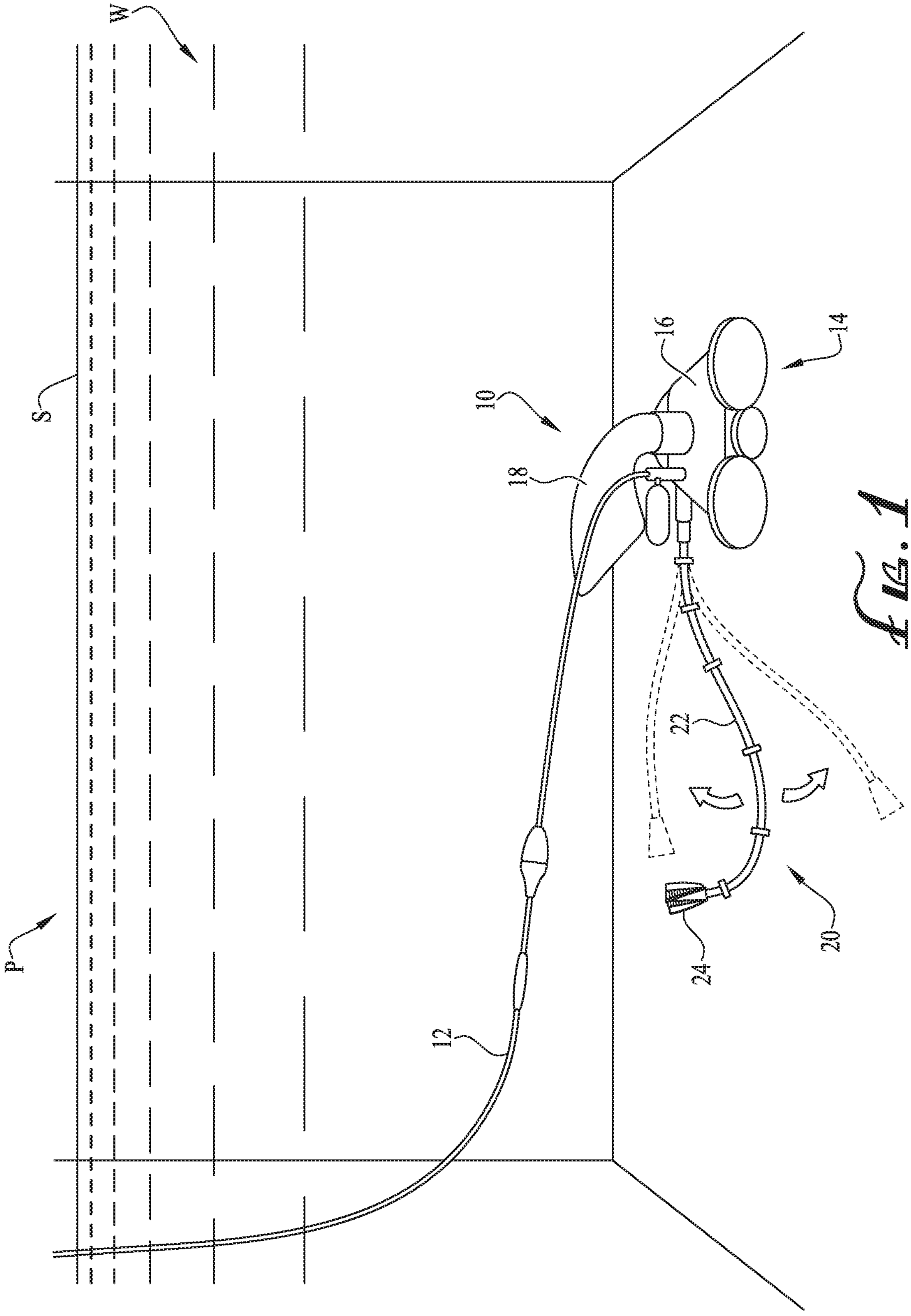
FIG. 1 shows a pool cleaner having a tail sweep diffuser nozzle according to an example embodiment of the invention.

With reference now to the drawing figures, FIG. 1 shows a pool cleaner 10 operating in a pool P, submerged in water W beneath the water surface S. In example applications, the pool P can be a swimming pool, a reservoir, a tank, or other contained body of water or other liquid bounded by one or more surfaces that may need to be cleaned on a periodic or continuous basis. The cleaner 10 may be a pressure-side pool cleaner including a fluid inlet line 12 for connection to a pressurized source of water or other fluid such as the return jet pressure-side of a pool filtration system pump, drive wheels 14, a housing body 16, and a filtration and collection bag 18. In alternate forms, the cleaner may be a suction-side or robotic cleaner. The cleaner 10 further comprises a tail sweep 20 comprising a length of tail sweep hose, tubing or other fluid conduit 22, and a diffuser nozzle 24. The diffuser nozzle 24 can take any of a variety of forms as disclosed in example embodiments herein. Pressurized water from the fluid inlet line drives a suction impeller to collect debris from bottom or sidewall surfaces of the pool P and/or from the water W, which is collected in the filtration and collection bag 18, and also drives one or more drive wheels 14 for locomotion of the cleaner 10 around the pool. The pressurized water flows through the cleaner and is discharged back into the pool through the tail sweep tubing 22 and out the tail sweep nozzle 24. In example embodiments, the pressurized water discharge causes the tail sweep 20 to whip back and forth as shown by broken lines in FIG. 1 as the cleaner operates. The discharge water spray from the tail sweep 20 and contact of the tail sweep as it slides along the surfaces of the pool P helps dislodge dirt and debris to clean the pool surfaces, and agitate and suspend debris in the water W for removal by the pool skimmer and filtration system.

FIGS. 2 (2A, 2B, 2C) and 3 (3A, 3B) show a spray diffuser nozzle 124 for a tail sweep 120 of a pool cleaner according to an example embodiment of the present invention. The diffuser 124 is coupled to the end of the tail sweep hose 122 which expels pressurized water out of the end of the hose. The diffuser 124 generally includes a flow shaping nozzle 130 configured to form an at least partially diverging pressurized water stream, for example a diverging fan-shaped or hollow cone shaped stream. The shaping nozzle 130 can be attached directly to the end of the hose 122. The diffuser 124 also includes a dissipating portion 150 configured to dissipate the diverging cone of pressurized water stream when the spray diffuser 124 is positioned above the surface S of the water W. The diffuser 124 can optionally include a cover 170 configured to fit over the dissipating portion 150 of the diffuser.

The shaping nozzle 130 has a first end and a second end, with an inner fluid flow channel or conduit extending therethrough. The first end includes an inlet opening and an attachment portion 132 configured for attachment to the end of the hose 122, as shown in FIG. 2B. An inlet stream of pressurized water from the pool cleaner tail sweep hose 122 enters the inlet opening of the shaping nozzle 130, passes through the fluid conduit through the shaping nozzle, and is discharged from the outlet opening as an outlet stream of pressurized water. In the depicted embodiment, the attachment portion 132 comprises a barbed or ribbed frictional outer engagement surface. The outer surface is configured to engage the inner surface of the end of the hose to create a friction hold, preferably without the need for a separate clamp or coupling. The outer surface of the attachment portion is configured to be push-fitted into the end of the hose, as shown in FIG. 2B. The pressurized fluid exiting the hose is able to flow through the conduit 134 into the diffuser portion as shown in FIGS. 3A and 3B.

The second end of the flow shaping nozzle 130 includes an outlet opening and a diffuser portion 140. An inlet stream of pressurized water from the pool cleaner tail sweep hose 122 enters the inlet opening of the shaping nozzle 130, passes through the fluid conduit through the shaping nozzle, and is discharged from the outlet opening as an outlet stream of pressurized water. The shaping nozzle is generally positioned such that the diffuser portion 140 sits on or just beyond the end of the hose 122. The diffuser portion 140 is configured to manipulate the pressurized water stream to form a discharge stream or jet of water having an at least partially hollow or diverging flow profile, for example in the form of a cone or fan shaped stream or flow as shown in FIGS. 3A and 3B. In the depicted embodiment, the diffuser portion 140 has a generally circular cross-section. In other embodiments, the diffuser 140 can be differently shaped. The diffuser portion 140 includes a top surface, a bottom surface, and a central opening. In use, the bottom surface of the diffuser portion 140 is positioned against or adjacent to the end of the hose of the tail hose sweep cleaner. The diffuser portion 140 is positioned such that the stream of water exiting the end of the hose passes through the central opening in the diffuser portion. The diffuser portion 140 also includes a flow impediment, obstruction, or flow slicer or diverter 142 configured to diffuse, deflect, split or otherwise disrupt the flow of the pressurized water stream, as shown in FIGS. 3A and 3B. The impediment or diverter 142 may be configured to create laminar flow where the drag force is proportional to the velocity. In the depicted embodiment, the impediment 142 includes a U-shaped cross-bar with first and second end portions and cross-bar portion therebetween. The first and second ends are attached to the top surface of the diffuser portion 140. The cross-bar portion is positioned just above the central opening of the flow conduit or channel 134 which extends through the shaping nozzle 130 and allows fluid flow therethrough. In example embodiments, the flow obstruction of the shaping nozzle is positioned immediately adjacent, for example no more than about one inch (1") from, the end of the tail sweep hose when the flow shaping nozzle is attached to the end of the tail sweep hose, to minimize or prevent flow misalignment that might otherwise cause flow obstruction to move out of the path of the stream of pressurized water in the event of an imprecise fit due to wear of connecting parts or loose tolerances. In other embodiments, other types or configurations of impediments or flow diverters can be used as described further below.

The diffuser nozzle 124 preferably also includes a flow dissipator or dissipating portion 150 configured to extend beyond the second end of the shaping nozzle 130. The dissipating portion 150 is configured to dissipate the at least partially divergent or hollow cone of the pressurized water stream when the spray diffuser is above the water surface. Generally, the dissipating portion 150 is formed from a cylindrical or tubular body defining an inner conduit or channel extending therethrough, surrounded by a tubular body having at least one hole or cutout formed therein. In the depicted embodiment, the dissipating portion 150 is formed from a sleeve 152 with a plurality of circularly shaped cutouts 154. In other embodiments, other shaped sleeves and cutouts can be used. As shown in FIG. 3A, when the diffuser nozzle 124 is under the surface S of the water W, the ambient water pressure forces the cone of the pressurized water stream to primarily exit a fluid discharge opening at the distal end 160 of the dissipating portion 150 in a tight solid cone or stream spray pattern that contributes to the whipping motion of the hose and cleaning of pool surfaces. When the diffuser is above the water surface as shown in FIG. 3B, the ambient air pressure is insufficient to maintain the tight cone of the pressurized water spray, and the water spray exits through the openings or cutouts 154 in the sleeve, dissipating the water spray into a mist or droplets and/or a more diffuse spray pattern. Thus, in the above-water mode of operation, the diverging flow of the outlet stream of pressurized water from the flow shaping nozzle impinges upon one or more dissipation elements of the dissipating portion, such as for example the interior sidewalls of the sleeve 152, cutouts 154, and/or one or more projections or surface features around the periphery of the flow channel through the dissipating portion, rather than passing through the fluid discharge opening in a concentrated stream. In this manner, when the diffuser nozzle 124 is above the water surface S, the discharged water is more widely diffused and does not spray very far, eliminating or substantially reducing the incidence of spraying water outside of the pool; but when the nozzle is submerged below the water surface the discharged water forms a more narrowly concentrated stream or jet for better cleaning of the pool surfaces. Any debris that enters the dissipating portion 150 is generally able to easily exit through the opening at the distal end 160 of the dissipating portion or through the large side openings 154, preventing or significantly reducing clogging issues associated with some previously known deflectors.

Figure 2A:
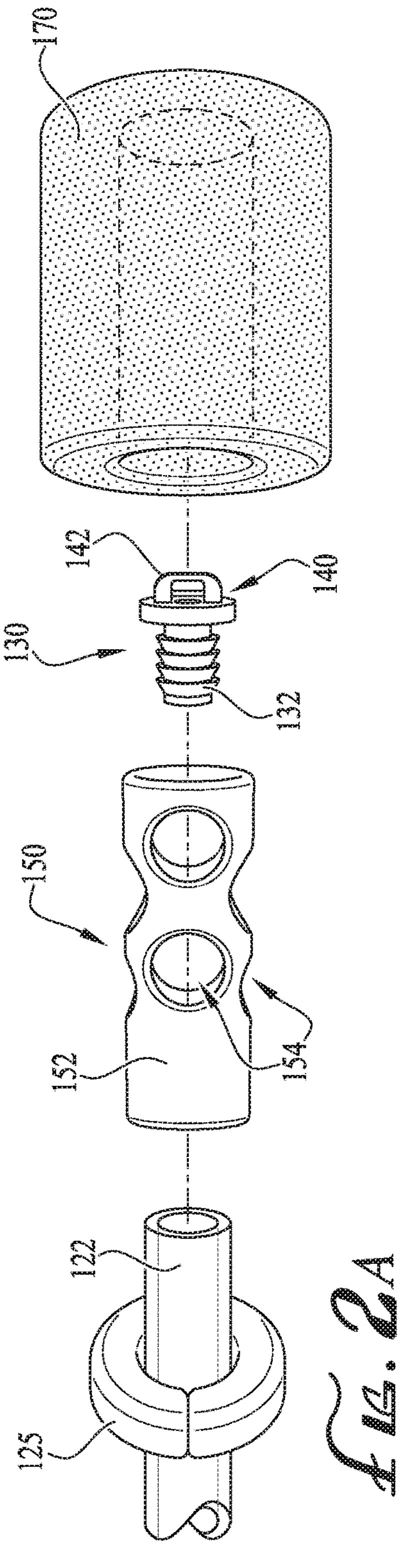
FIGS. 2A, 2B and 2C show a sequence of assembly of a tail sweep diffuser nozzle for a pool cleaner, according to another example embodiment of the invention.
Figure 2B:
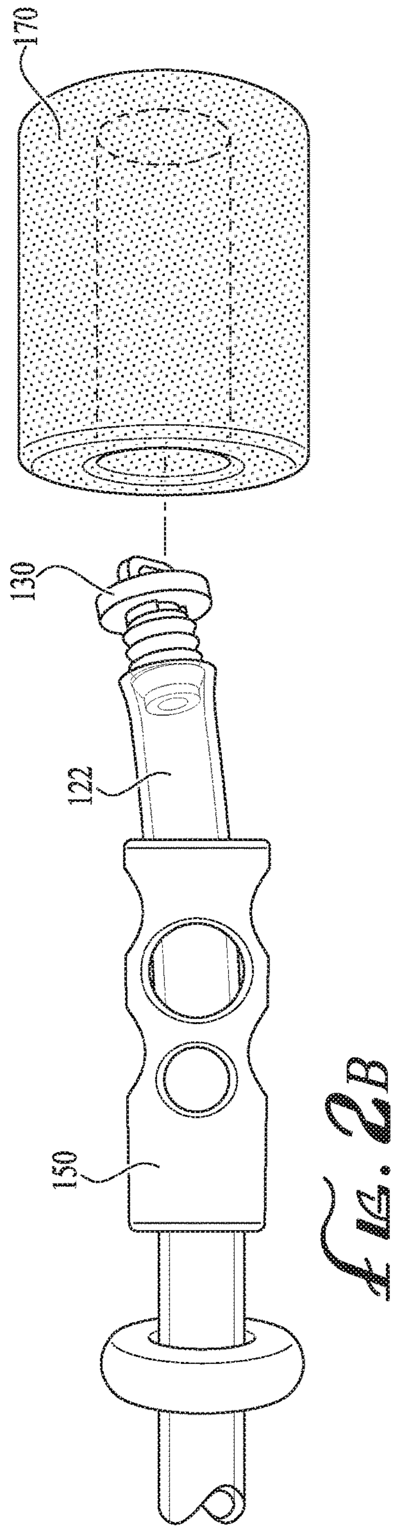
Figure 2C:
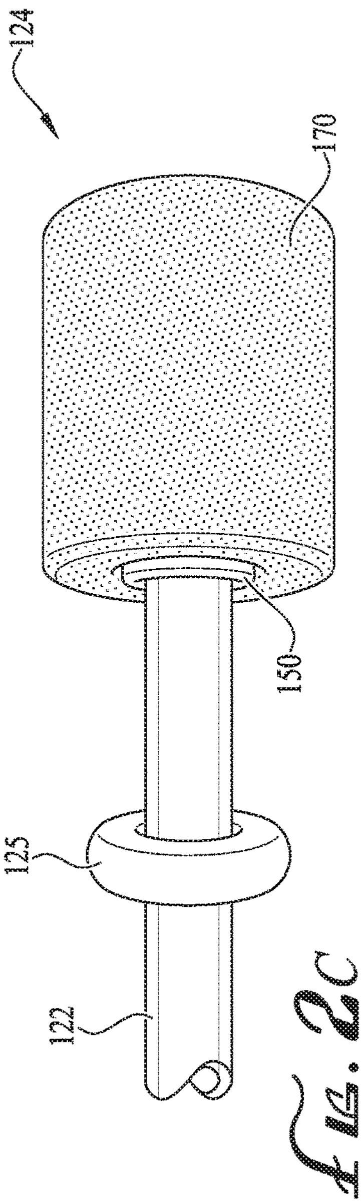
Figure 3A:
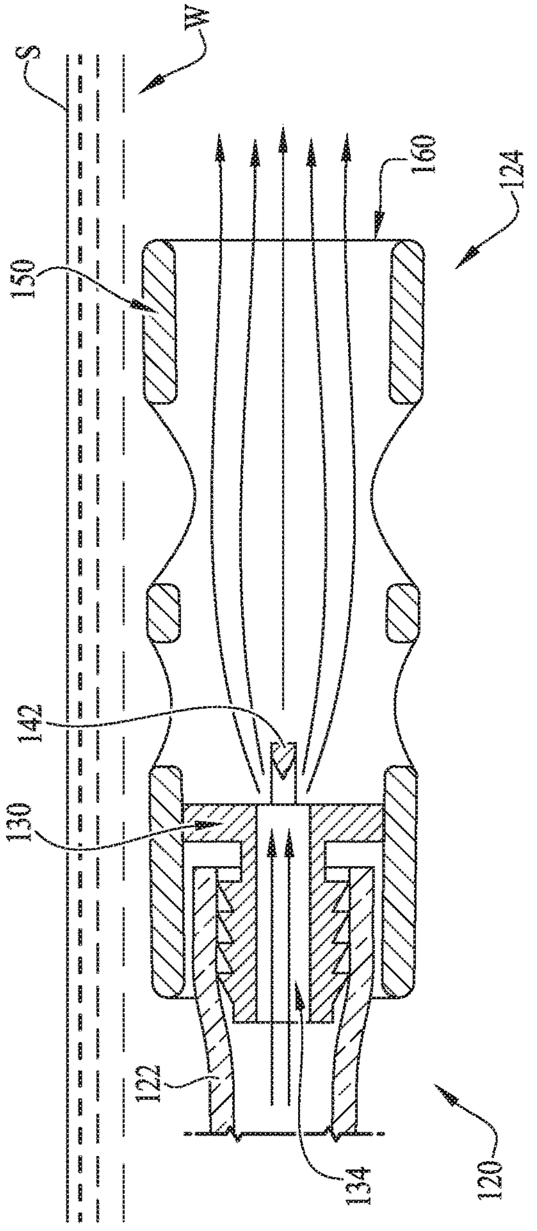
FIGS. 3A and 3B show example flow patterns discharged through a tail sweep diffuser nozzle when submerged below a water surface and above the water surface.
Figure 3B:
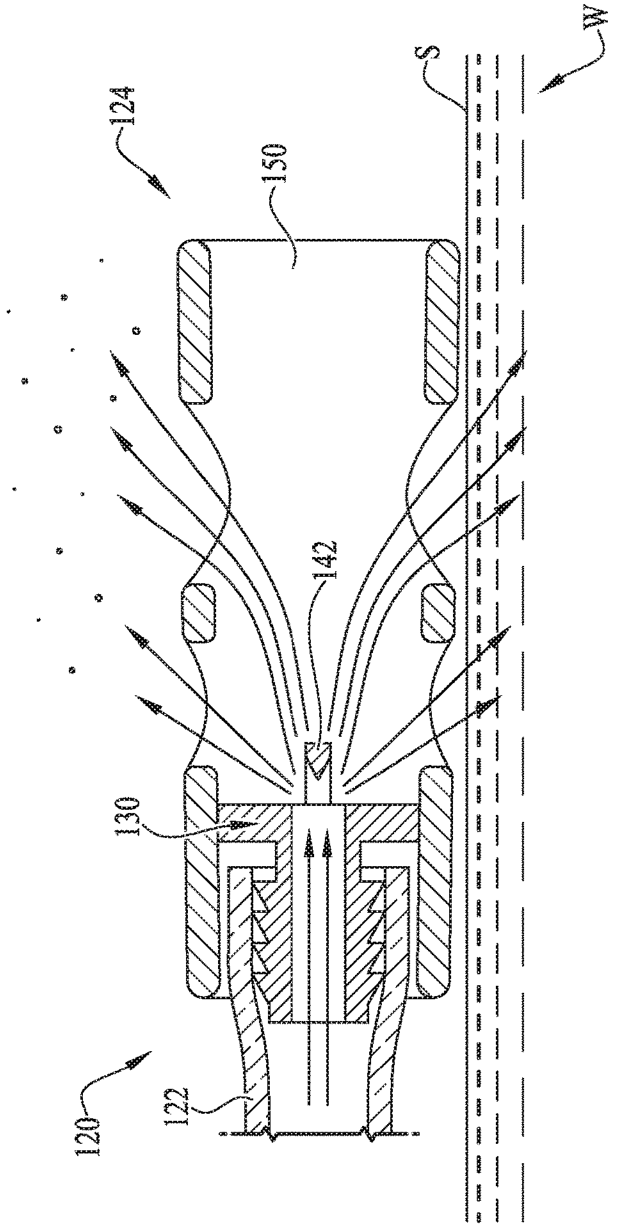

The dissipating portion 150 can optionally be configured to receive and retain a foam cover 170, as shown in FIGS. 2A, 2B and 2C. In the depicted embodiment, the dissipating portion 150 is configured to surround and provide a retaining sleeve for the shaping nozzle 130. In this configuration, where the shaping nozzle 130 and dissipating portion 150 are detachable, the same shaping nozzle design can be used with a plurality of dissipating portion designs or can be used independently. In other embodiments, the dissipating portion can be a unitary piece as described below. In still other embodiments, the dissipating portion can be attached to the top surface of the shaping nozzle.

In some embodiments, the diffuser nozzle 124 is configured to be smaller, more lightweight, and cheaper to manufacture than many previously known tail sweep diffuser nozzles. In some example embodiments, the outer diameter of the diffuser is about 20% smaller than prior art deflectors. In some example embodiments, the length of the diffuser is about 40% shorter than prior art deflectors. As a result, in some embodiments the diffuser and foam scrubbers last longer. In some example embodiments, the length of the diffuser is between about 2 inches and about 3 inches. In some example embodiments, the length of the diffuser is about 2.7 inches. In other embodiments, the length of the diffuser can be larger or smaller. In some example embodiments, the outside diameter of the diffuser is around 1 inch. In other embodiments, the outside diameter of the diffuser can be larger or smaller.

FIGS. 2A, 2B and 2C show a sequence or method of assembly of a tail sweep diffuser nozzle 124 according to an example embodiment of the invention. If the tail sweep has a different diffuser nozzle already installed, it may be removed by disassembly or by cutting of the end of the tail sweep tubing. A spacer ring or bushing 125 may be installed over the end of the tail sweep tubing 122 in typical fashion, as shown in FIG. 2A. The dissipating tube 150 is installed by sliding it onto and over the end of the tail sweep tubing 122. The barbed end 132 of the shaping nozzle 130 is then inserted into the end of the tail sweep tubing 122 with a press fit, preferably using moderate to strong hand pressure without the need for tools, as shown in FIG. 2B. The dissipating tube 150 is then pulled forward over the shaping nozzle 130, as shown in FIGS. 3A and 3B. Optionally, a snap-fit coupling is formed between the dissipating tube 150 and the shaping nozzle 130 to maintain the parts in proper engagement. A foam cover 170 may optionally be installed over the dissipating tube 150, and removably and replaceably retained thereon by friction or releasable adhesive.

Figure 4:
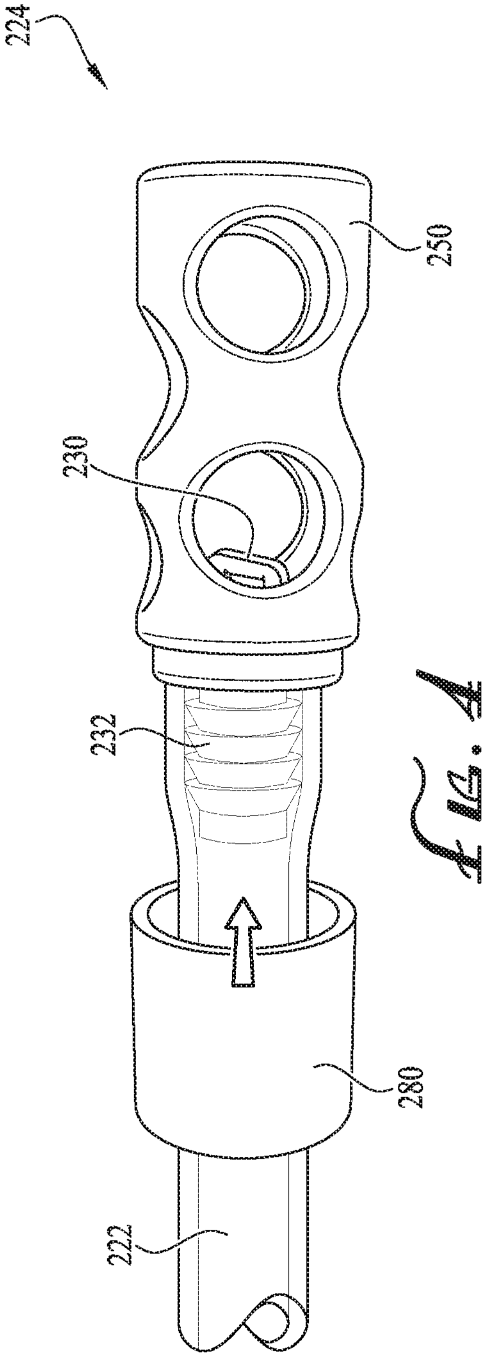
FIG. 4 shows a tail sweep diffuser nozzle for a pool cleaner, according to another example embodiment of the invention.

FIG. 4 shows a spray diffuser 224 for a pool cleaner tail sweep according to another example embodiment of the present invention. The diffuser 224 of this depicted embodiment includes shaping nozzle portion 230 and a dissipating portion 250 similar to the previous embodiment. In this depicted embodiment, the dissipating portion 250 is integrally formed with, or is permanently or semi-permanently coupled to the shaping nozzle portion 230, forming a unitary one-piece body. A retaining cap 280 generally includes an end surface comprising a central opening configured to receive the tail sweep hose 222, and a sidewall extending from the periphery of the end surface. In use, the sidewall of the retaining cap is positioned around the barbed first end 232 of the shaping nozzle portion 230. The sidewalls are configured to surround the attachment portion of the shaping nozzle to hold it in engagement with the hose 222. The retaining cap is generally removably coupled to the shaping nozzle portion 230. In other embodiments, the retaining cap 280 is permanently or semi-permanently attached to the diffuser and shaping nozzle. In the depicted embodiment, the top of the sidewall of the retaining cap 280 abuts the bottom of the dissipating portion 250. Together, they form a retainer ring configured to hold the shaping nozzle portion 230 in engagement with the end of the hose 222.

Figure 5:
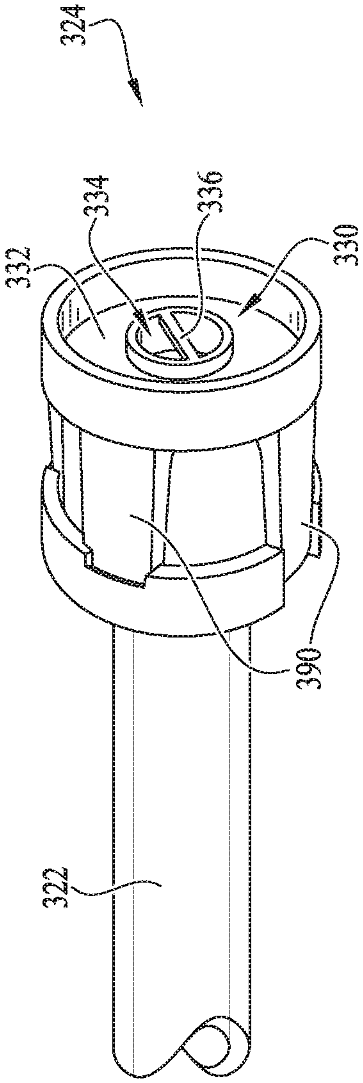
FIG. 5 shows a tail sweep diffuser nozzle for a pool cleaner, according to another example embodiment of the invention.
Figure 6:
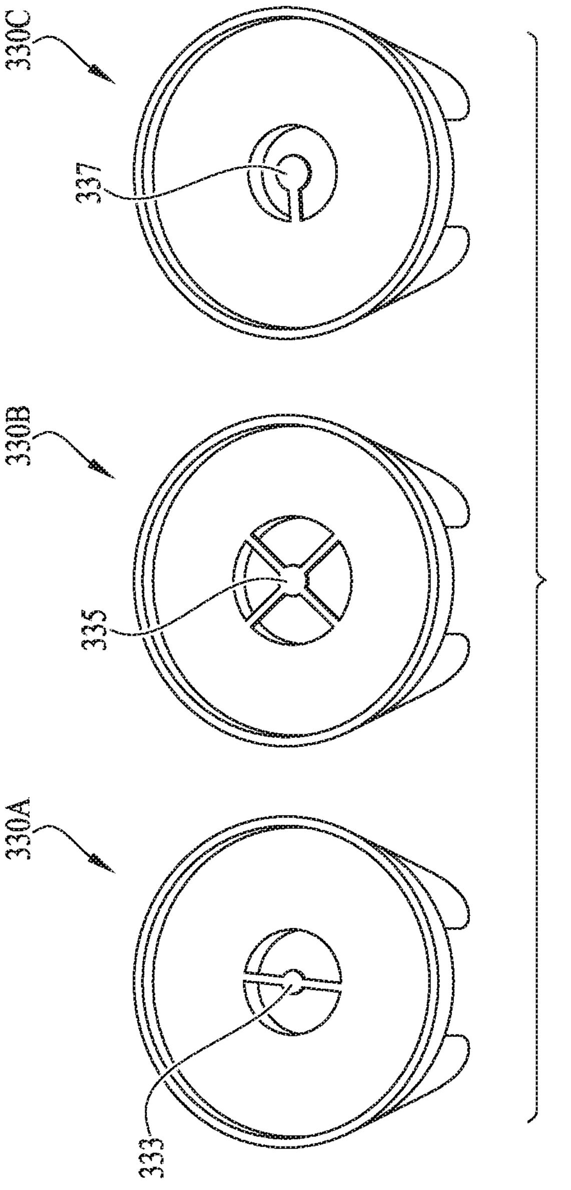
FIG. 6 shows alternative flow diverter configurations for pool cleaner tail sweep diffuser nozzles, according to further example embodiments of the invention.

FIG. 5 shows a spray diffuser 324 for a pool cleaner tail sweep according to another example embodiment of the present invention. This depicted embodiment includes a shaping nozzle 330 similar to that of the previous embodiments. In this depicted embodiment, the flow diversion or deflection portion is formed from a disk 332 with a central opening 334. The disk 332 includes a bottom surface and a top surface. In example embodiments, the dimensions of the central opening 334 can be selected to optimize the flow of the pressurized stream of water from the end of the hose 322. The shaping nozzle includes a deflection element or impediment 336 generally positioned in the central opening 334 of the deflection portion The impediment 336 is configured to slice, divert, or cut at least a portion of the pressurized water stream exiting the end of the hose. The impediment 336 can be held in position by a cross-bar extending across the central opening, a series of cross-bars, or a rod extending between the sidewall of the central opening and the impediment. In alternate embodiments, for example as shown in FIG. 6, the deflection element of a shaping nozzle 330A, 330B or 330C can include a bead or tear-drop shaped impediment 333 positioned in the opening, a cross-wise impediment 335, a cantilever supported impediment 337, or various other configurations. In other embodiments, the impediment is formed from a cross-bar itself (or a plurality of cross-bars). In example embodiments, the cross-bar is shaped and dimensioned to deflect the pressurized stream of water exiting the end of the hose to create laminar flow dispersion or diffusion.

As shown in FIG. 5, the spray diffuser 324 includes an attachment portion or retaining cap comprising a series of clips 390 positioned around the outer periphery of the bottom surface of the deflection disk. The clips 390 are configured to fit around the outside of the end of the hose 322 to hold the diffuser 324 in engagement with the end of the hose. In example embodiments, the attachment portion is configured to releasably attach the diffuser 324 to the end of the hose 322. In other embodiments, the diffuser 324 is permanently attached to the end of the hose 322. While the attachment portion of the depicted embodiment includes clips 390 that are push fitted over the end of the hose, other attachment means can be used including snaps, straps, and elastic elements. Preferably, the attachment means does not require any tools to attach or detach the diffuser to the hose, simplifying installation for the user. The attachment portion is configured to position the bottom of the deflection disk 332 against or in close proximity to the end of the hose 322. Therefore, the deflection element 336 is positioned at or near the end of the hose 322. In other example embodiments, the diffuser can also include a retaining cap positioned around the first end of the shaping nozzle. The sidewalls are configured to surround the end of the attachment clips to help hold them in engagement with the hose. The retaining cap may be generally removably coupled to the attachment portion of the shaping nozzle to help hold it in engagement with the end of the hose, or may be permanently or semi-permanently attached to the diffuser.

Figure 7:
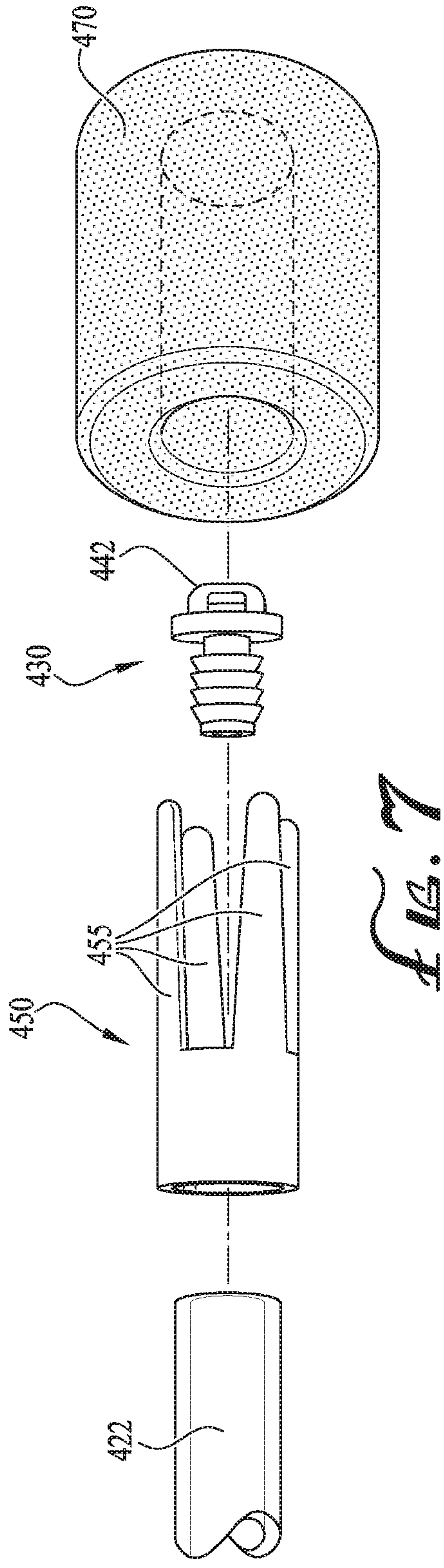
FIG. 7 shows a tail sweep diffuser nozzle for a pool cleaner, according to another example embodiment of the invention.

FIG. 7 shows a spray diffuser 424 for a pool cleaner tail sweep according to another example embodiment of the present invention. The diffuser 424 generally includes a shaping nozzle 430 and a dissipating portion 450 similar to the previously described embodiment of FIGS. 2 and 3. The dissipating portion 450 is configured to receive a foam cover 470 that is push fitted over the dissipating portion. In example embodiments, the foam cover 470 is configured to cover the entire dissipating portion 450 up to the top surface of the shaping nozzle. In other embodiments, the foam cover 470 covers only a portion of the dissipating portion 450. Generally, the diffuser portion includes a series of openings configured to optimize and dissipate water flow through the foam cover 470. In the depicted embodiment, the dissipating portion 450 is formed from a plurality of blades or fins 455 extending upward from the top surface of the shaping nozzle 430. The blades or fins 455 can be tapered such that the bottom of the blade is wider than the top of the blade. The blades or fins 455 can also be formed of a flexible, resilient material that provides an outward force on the foam cover 470 to help hold the foam cover in engagement with the dissipating portion 450. In use, the deflection impediment 442 of the shaping nozzle 430 is positioned between the dissipating portion 450 and the end of the hose 422. The dissipating portion 450 is first placed onto the end of the hose 422, and then the shaping nozzle 430 is installed by engagement of its barbed outer engagement surface into the lumen of the hose. The dissipating portion 450 is then advanced into engagement with the shaping nozzle 430, for example engaging with a snap coupling to retain the dissipating portion in place. The foam cover 470 is then installed onto the blades or fins 455.

Figure 8A:
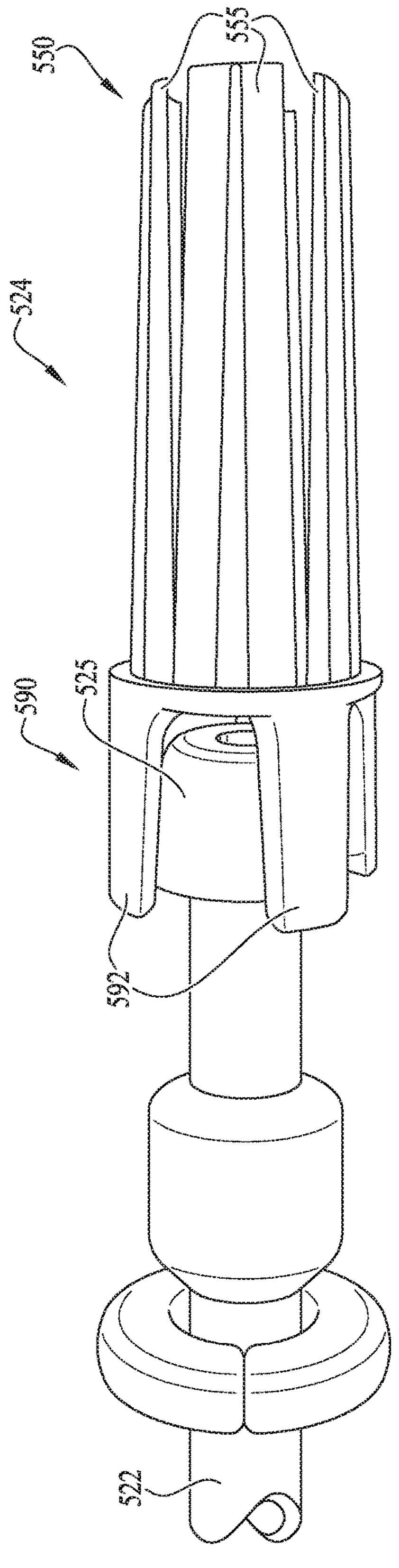
FIGS. 8A, 8B and 8C show a tail sweep diffuser nozzle for a pool cleaner, according to another example embodiment of the invention.
Figure 8C:
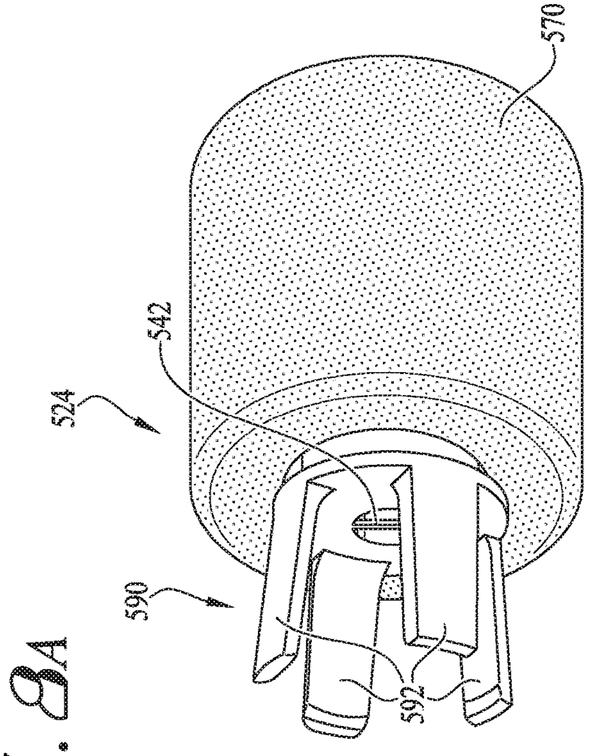
Figure 8B:
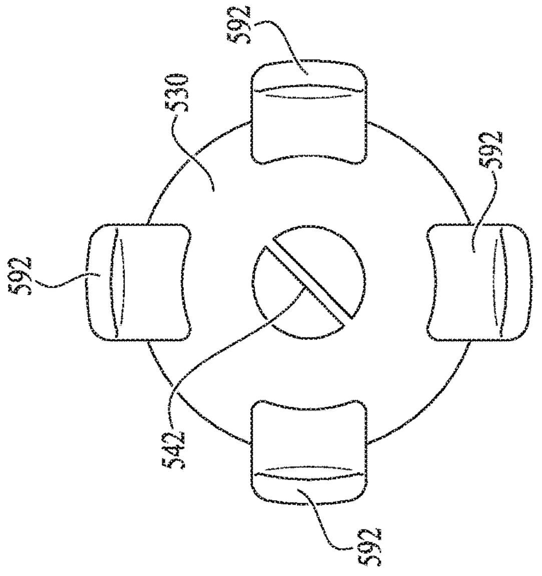

In another example embodiment, as shown in FIG. 8 (FIGS. 8A, 8B, 8C), a spray diffuser nozzle 524 for a pool cleaner tail sweep includes a shaping nozzle portion 530 and a dissipating portion 550 that are integrally formed or permanently attached to form a one-piece unitary body. The shaping nozzle portion 530 includes a flow deflection member 542 in similar fashion to above-described embodiments, and the dissipating portion 550 includes blades or fins 555 for retaining a foam cover 570 thereon. The nozzle 524 optionally also comprises a retainer portion 590 comprising a plurality of prongs or clips 592 configured for releasable engagement with a flared or expanded coupling 525 installed at the end of the tail sweep hose 522. The flow deflection member 542 is preferably located at the base or proximal end of the nozzle 524 adjacent the retainer portion 590, to better maintain alignment of the flow deflection member in the stream of water discharged from the end of the hose 522, even if the connection between the retainer portion and the hose coupling 525 may be loose due to wear of the parts.

Figure 9A:
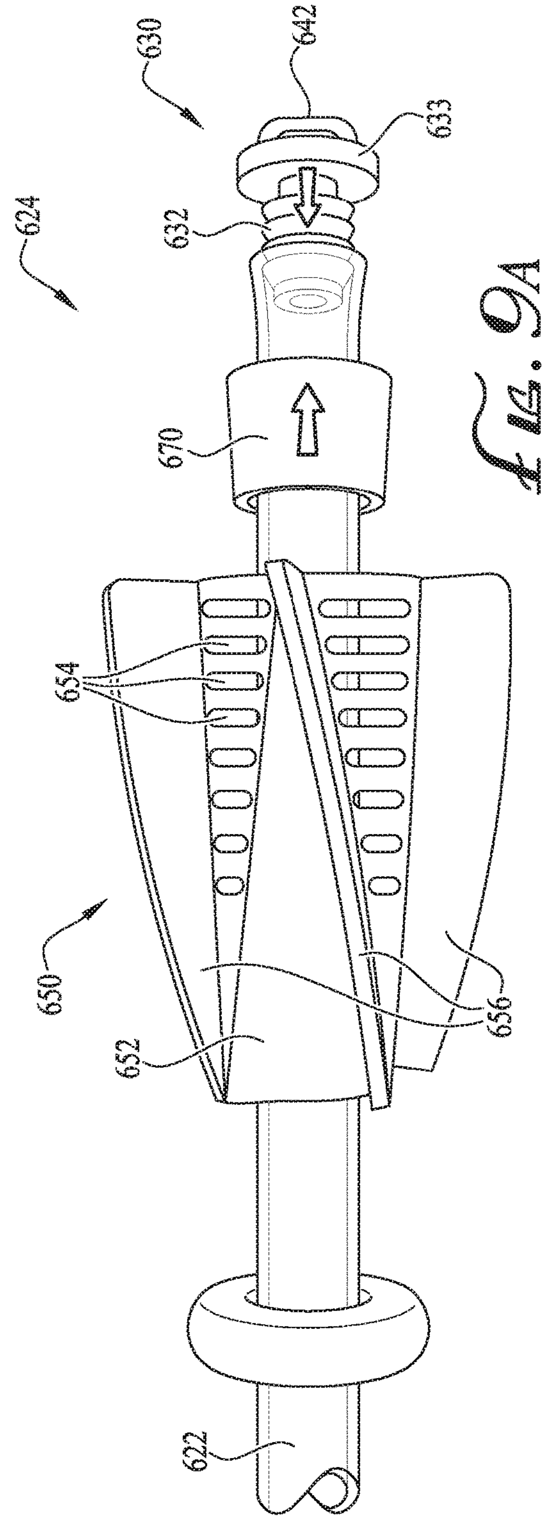
FIGS. 9A and 9B show a tail sweep diffuser nozzle for a pool cleaner, according to another example embodiment of the invention.
Figure 9B:
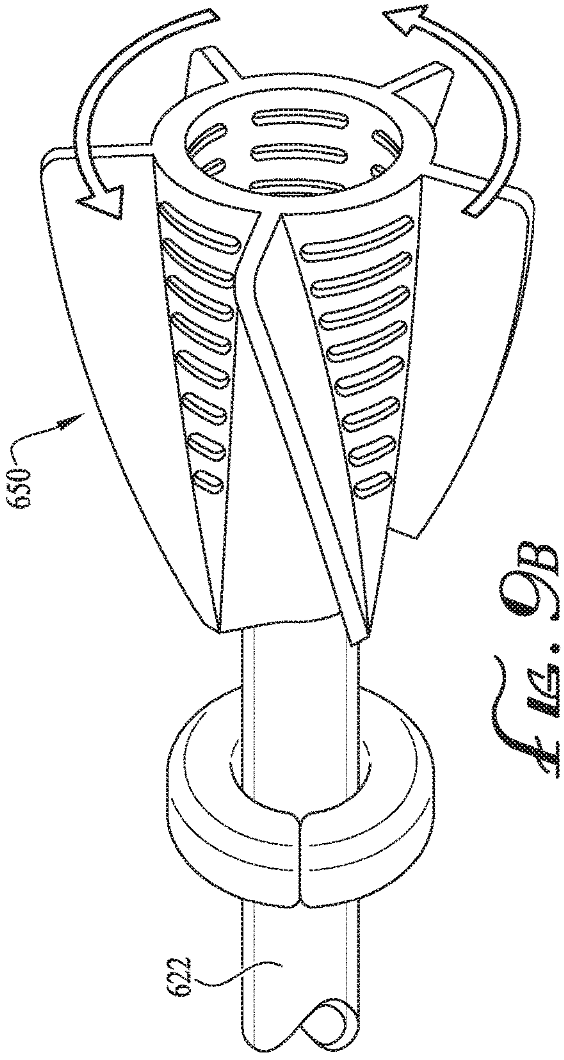

FIGS. 9A and 9B show a spray diffuser nozzle 624 for a pool cleaner tail sweep according to another example embodiment of the present invention. In this embodiment, at least a portion of the diffuser is configured to spin about an axis of rotation parallel or coincident with the axis of the tail sweep hose 622; or alternatively considered, rotational about an axis generally aligned with the outlet stream of pressurized water from the flow shaping nozzle 630. The diffuser 624 is coupled to the end of the tail sweep hose 622 which expels pressurized water out of the end of the hose. The spinning diffuser 624 generally includes a flow shaping nozzle 630 configured to form a discharge stream or jet of pressurized water having an at least partially hollow or diverging flow profile, for example in the form of a cone, and a dissipating portion 650 configured to dissipate the pressurized water stream when the diffuser 624 is positioned above the surface of the water. The dissipating portion 650 is generally free to spin or rotate about the end of the hose. In example embodiments, the dissipating portion 650 includes a spinning feature that causes the dissipating portion to spin in response to the action of the tail sweep pool cleaner as it moves through the pool and/or in response to the flow of the pressurized water stream.

The shaping nozzle 630 includes a first end defining an inlet opening and a second end defining an outlet opening, with a fluid flow channel or conduit extending therethrough. The first end includes a barbed or ribbed attachment portion 632 configured for engagement within the end of the hose 622. The attachment portion is configured to be pushed or press-fitted into the end of the hose 622. An inlet stream of pressurized water from the tail sweep hose 622 is received in the inlet opening of the shaping nozzle 630, passes through the fluid conduit, and is discharged from the outlet opening as an outlet stream of pressurized water. The pressurized fluid exiting the hose is able to flow through the conduit into the diffuser portion of the shaping nozzle. In other embodiments, the attachment portion can be attached to the outside of the hose. The second end of the shaping nozzle 630 includes a diffuser portion 633. The shaping nozzle 630 is generally positioned such that the diffuser portion 633 sits on or just beyond the end of the hose, to prevent flow misalignments. The diffuser portion is configured to manipulate the pressurized water stream to form a discharge stream or jet of water having an at least partially hollow or diverging flow profile, for example in the form of a cone or fan shaped stream or flow pattern. In the depicted embodiment, the diffuser portion 633 has a generally circular cross-section. In other embodiments, the diffuser can be differently shaped. The diffuser portion 633 includes a top surface, a bottom surface, and a central opening. In use, the bottom surface of the diffuser portion is positioned against or adjacent to the end of the hose of the tail hose sweep cleaner. The diffuser portion 633 is positioned such that the stream of water exiting the end of the hose 622 passes through the central opening in the diffuser portion. The diffuser portion also includes a flow deflection obstruction or impediment 642 configured to diffuse, deflect, split or otherwise disrupt the flow of the pressurized water stream. The flow deflection impediment or slicer 642 is optionally configured to create a laminar flow where the drag force is proportional to the velocity. In the depicted embodiment, the flow deflection obstruction or impediment 642 includes a U-shaped cross-bar with first and second end portions and cross-bar portion therebetween. The first and second ends are attached to the top surface of the diffuser portion 633. The cross-bar portion is positioned just above the central outlet opening in the diffuser portion. In other embodiments, other types of flow deflection impediments can be utilized. In example embodiments, the flow obstruction 642 is positioned immediately adjacent, for example no more than about 1" from, the end of the tail sweep hose when the flow shaping nozzle is attached to the end of the tail sweep hose, to minimize or prevent flow misalignment during use.

The spinning diffuser nozzle 624 preferably also includes a flow dissipator or dissipating portion 650 configured to extend beyond the second end of the shaping nozzle 630. The dissipating portion 650 preferably comprises at least one dissipation element, and is configured to dissipate the pressurized water stream when the spray diffuser 624 is above the water surface. Generally, the dissipating portion 650 is formed from a cylindrical channel having at least one hole or cutout. In the depicted embodiment, the dissipating portion 650 is formed from a sleeve 652 with a plurality of slot cutouts 654 that run perpendicular to the length of the dissipating portion. In other embodiments, other shaped sleeves and cutouts can be used. When the diffuser 624 is underwater, the ambient water pressure forces the diverging stream or cone of pressurized water to primarily exit a fluid discharge opening at the open distal end of the dissipating portion 650 causing a concentrated or tight solid stream or cone spray that contributes to the whipping motion of the hose and tail sweep, and helping dislodge dirt and debris from pool surfaces. Water surrounding the diffuser 624 is drawn into the dissipating portion 650 through openings 654 by the Venturi effect as the pressurized stream of water from the tail sweep hose 622 passes through the dissipating portion and is discharged out the open distal end. When the diffuser 624 is above the water surface, the ambient air pressure is insufficient to maintain the tight cone spray, and the water stream diverges outwardly as it passes over the flow deflection impediment 642, spraying against the interior surface and/or other dissipation elements of the dissipating portion 650 and exiting through the openings or cutouts 654 in the sleeve 652, thus dissipating the water spray into a mist or diffuse spray rather than a concentrated stream, thereby preventing or substantially reducing the incidence of water spraying out of the pool. In example embodiments, the shaping nozzle 630 prevents the dissipating portion 650 from disengaging from the end of the hose.

The dissipating portion 650 preferably comprises a spinning component or rotational aspect configured to impart a rotational motion to the dissipating portion 650 as it moves through the water. The spinning dissipating portion is attached to end of the tail sweep hose such that it can rotate about the end of the hose. In the depicted embodiment, the spinning component is formed from a plurality of pitched or helical blades 656 on an exterior surface of the sleeve, extending from a first end of the dissipating portion 650 to the second end of the dissipating portion. In other embodiments, the helical blades 656 can extend along only a portion of the length of the sleeve. In example embodiments, the blades 656 are integrally formed on the exterior surface of the sleeve 652 of the dissipating portion. As the dissipating portion 650 is pulled through the water, the water flow over the pitched blades 656 causes the dissipating portion to rotate relative to the end of the hose 622. The pitched blades 656 can be formed of a hard material such as a rigid plastic. In other embodiments, the pitched blades 656 can be formed from a flexible material such as silicon. The rotation of the dissipating portion 650 can contribute to the whipping motion of the tail sweep hose 622. The rotating blades 656 can also serve to scrape or brush the floor and sides of the pool P and help agitate dirt and debris.

The spinning diffuser 624 optionally also comprises a retaining cap 670, having a central opening configured to receive the hose, and a sidewall extending upward from the periphery of the end surface. In use, the sidewall of the retaining cap 670 is positioned around the first, attachment end of the shaping nozzle 630 of the diffuser. The sidewalls are configured to surround the attachment portion of the shaping nozzle to hold it in engagement with the hose 622. The retaining cap 670 is generally removably coupled to the shaping nozzle of the diffuser. In other embodiments, the retaining cap is permanently or semi-permanently attached to the shaping nozzle. The retaining cap 670 optionally also functions as a rotational bearing or bushing for low-friction contact with an inner surface of the spinning dissipating portion 650. In example embodiments, the diffuser nozzle 624 comprises at least one spinning component, such as the dissipating portion, which is passively driven to spin at the tail sweep moves through the water due to the helical blades 656 passing through the water. In other embodiments, the at least one spinning component may be actively driven to spin, for example by provision of a helical rotor or propeller in the path of the pressurized water flow from the tail sweep hose through the diffuser.

Figure 10A:
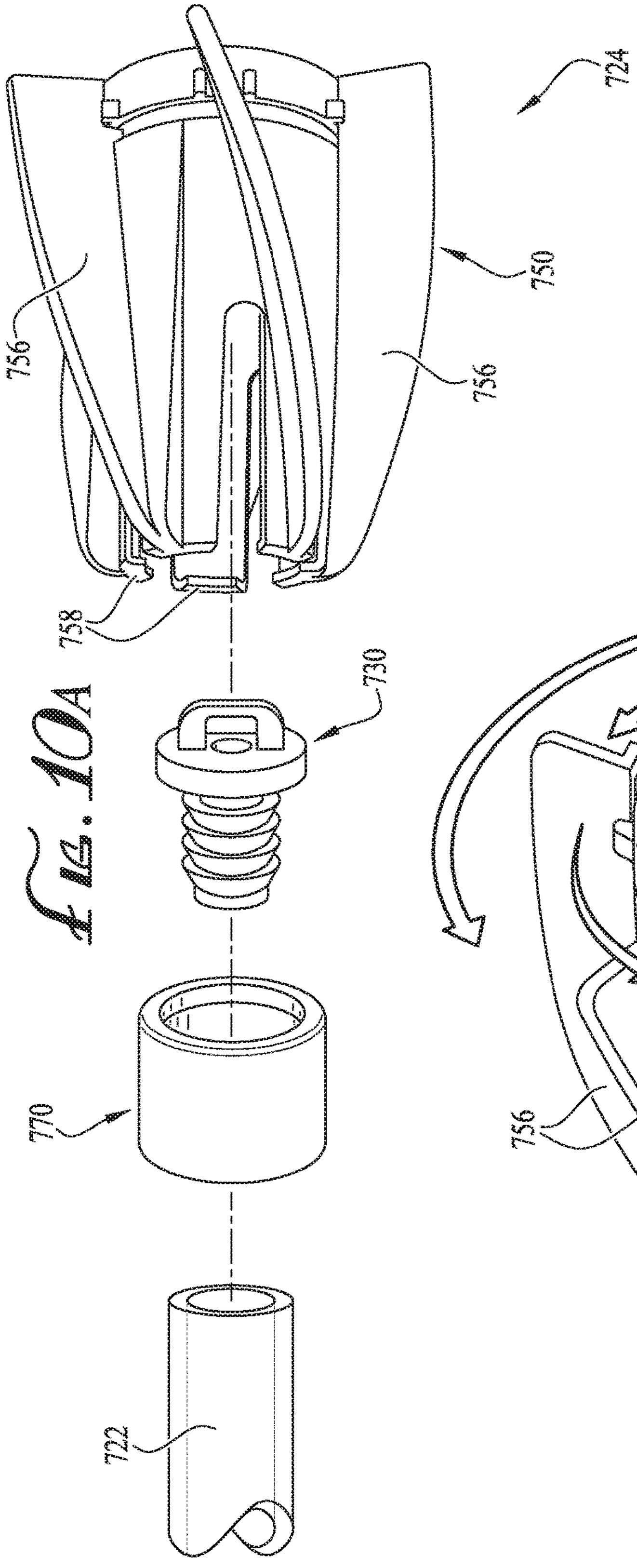
FIGS. 10A and 10B show a tail sweep diffuser nozzle for a pool cleaner, according to another example embodiment of the invention.
Figure 10B:
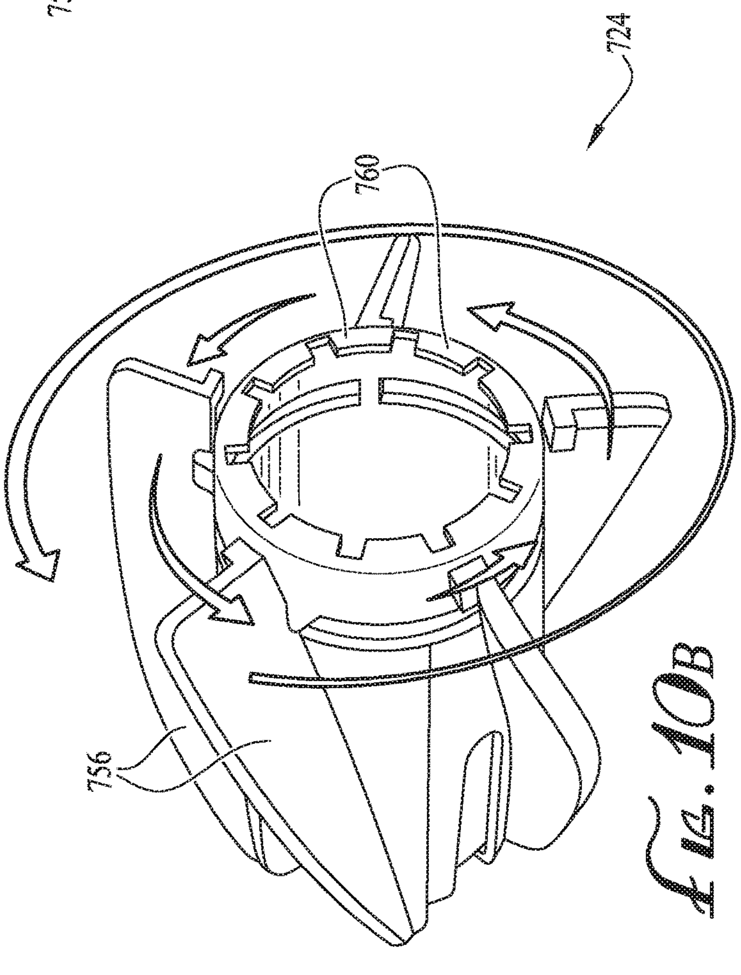

FIGS. 10A and 10B show another example embodiment of a spinning diffuser nozzle 724 for a pool cleaner tail sweep. Similar to the above described embodiment, diffuser 724 comprises a includes a flow shaping nozzle 730 configured to form a discharge stream or jet of water having an at least partially hollow or diverging flow profile, for example in the form of a cone, and a dissipating portion 750 configured to dissipate the pressurized water stream when the diffuser 724 is positioned above the surface of the water. The dissipating portion 750 is generally free to spin or rotate about the end of the hose. A retaining cap 770 mounts over the tail sweep hose 722 to secure the shaping nozzle 730 in the hose and to provide a bearing or busing surface about which the dissipating portion 750 spins. The dissipating portion comprises a plurality of helical fins or blades 756 spaced about its exterior surface to generate a spinning motion as the diffuser 724 is moved through the water. The proximal or front end of the dissipating portion 750 comprises a plurality of resilient clips or fingers 758 configured to retain the dissipating portion in engagement with the retaining cap 770 when assembled for use, with slots extending axially between adjacent fingers. The distal or rear end of the dissipating portion comprises one or more inwardly directed flanges 760 for dissipating the stream of pressurized water flowing through the diffuser nozzle 724 when the nozzle is above the water surface. The flanges 760 can optionally be helically oriented to impart additional driving force to spin the dissipating portion as the pressurized stream of water passes across the flanges when the diffuser nozzle 724 is submerged beneath the water surface.

Figure 11A:
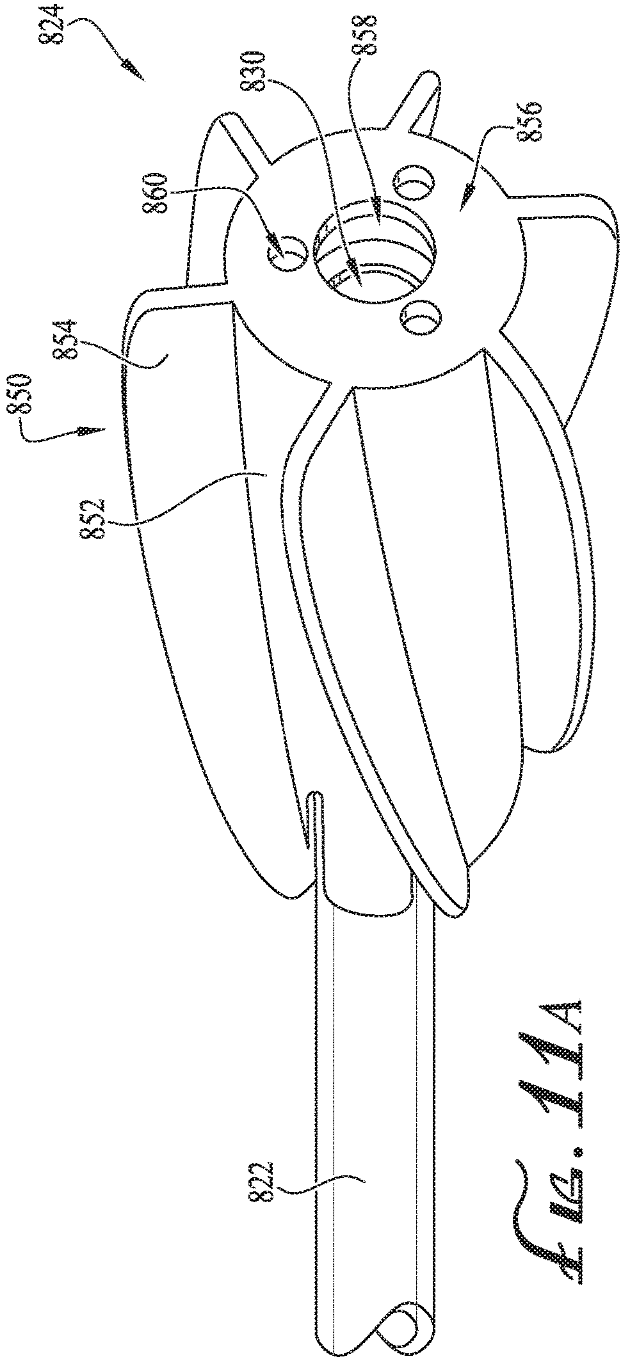
FIGS. 11A and 11B show a tail sweep diffuser nozzle for a pool cleaner, according to another example embodiment of the invention.
Figure 11B:
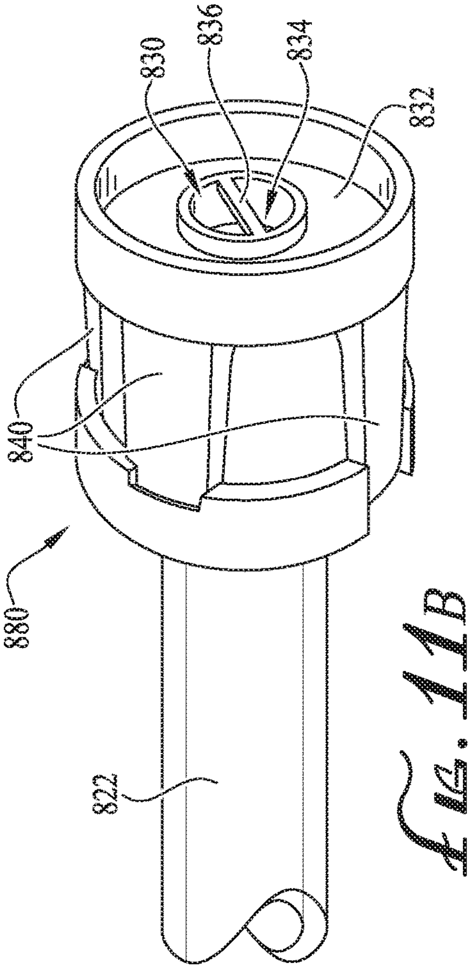

FIGS. 11A and 11B show a spinning diffuser 824 according to another example embodiment of the present invention. The spinning diffuser 824 includes a shaping nozzle 830, a spinning diffuser 850, and a retaining cap 880. The shaping nozzle 830, shown best in FIG. 11B, includes a flow deflection portion formed from a disk 832 with a central opening 834. The disk includes a bottom surface and a top surface. The shaping nozzle includes a flow deflection element or impediment 836 generally positioned in the central opening of the deflection portion. The impediment 836 is configured to slice, divert, or cut at least a portion of the pressurized water stream exiting the end of the tail sweep hose 822 and form a diverging flow pattern of pressurized water discharged from the shaping nozzle. In example embodiments, the impediment 836 is formed from a cross-bar or a plurality of cross-bars. In example embodiments, the cross-bar is shaped and dimensioned to deflect the pressurized stream of water exiting the end of the hose to create laminar flow.

In the depicted embodiment, the attachment portion comprises a series of clips 840 positioned around the outer periphery of the bottom surface of the deflection disk. The clips 840 are configured to fit around the outside of the end of the hose to hold the diffuser 824 in engagement with the end of the tail sweep hose 822. In example embodiments, the attachment portion is configured to releasably attach the diffuser 824 to the end of the hose 822. In other embodiments, the diffuser 824 is permanently attached to the end of the hose 822. While the attachment portion of the depicted embodiment includes clips 840 that are push fitted over the end of the hose, other attachment means can be used including snaps, straps, and elastic elements. Preferably, the attachment means does not require any tools to attach or detach the diffuser to the hose, simplifying installation for the user. The attachment portion is configured to position the bottom of the deflection disk 832 against or in close proximity to the end of the hose. Therefore, the deflection element 836 is positioned at or near the end of the hose 822. In example embodiments, the diffuser 824 can also include a retaining cap 880, best seen in FIG. 11B. The retaining cap 880 is similar to the retaining cap in the previously described embodiment. In use, the sidewall of the retaining cap is positioned around the first end of the shaping nozzle 830. The sidewall is configured to substantially surround the end of the attachment clips 840 to help hold them in engagement with the tail sweep hose 822. The retaining cap 880 is generally removably coupled to the attachment portion of the shaping nozzle 830 to help hold it in engagement with the end of the hose 822. In other embodiments, the retaining cap 880 is permanently or semi-permanently attached to the diffuser 824.

The dissipating portion 850 includes a sleeve 852 with pitched or helical blades 854 as in the previous embodiment. The sleeve 852 of the depicted embodiment does not include openings. In other embodiments, the sleeve 852 can include openings as in the previous embodiment. The dissipating portion 850 of the depicted embodiment also includes an end cap 856 positioned at the second end of the dissipating portion. The end cap 856 generally includes a large central opening 858 and plurality of smaller diffusing openings 860 positioned around the central opening. When the diffuser 824 is positioned below the water surface S, the Venturi effect results in a reduction in pressure between the bottom of the cap 856 of the dissipating portion 850 and the top of the shaping nozzle 830. As a result, the dissipating portion 850 is retracted such that the bottom or interior face of the cap 856 is flush or adjacent to the top or exterior face of the shaping nozzle 830. In this position, the pressurized water stream from the tail sweep hose 822 passes substantially unobstructed through the large central opening 858 in the cap 856. When the diffuser 824 is positioned above the water surface S, the Venturi effect is not present and the pressurized water stream from the hose 822 pushes the cap 856 of the dissipating portion 850 away from the shaping nozzle 830, and the divergence of the pressurized water stream caused by flow impediment 836 causes the water stream to impinge upon the inner face of the end cap 856 of the dissipating portion 850 forming a mist or diffuse spray exiting the small openings 860 and the large opening 858, rather than a concentrated stream, eliminating or reducing the incidence of water spraying out of the pool P.

Figure 12:
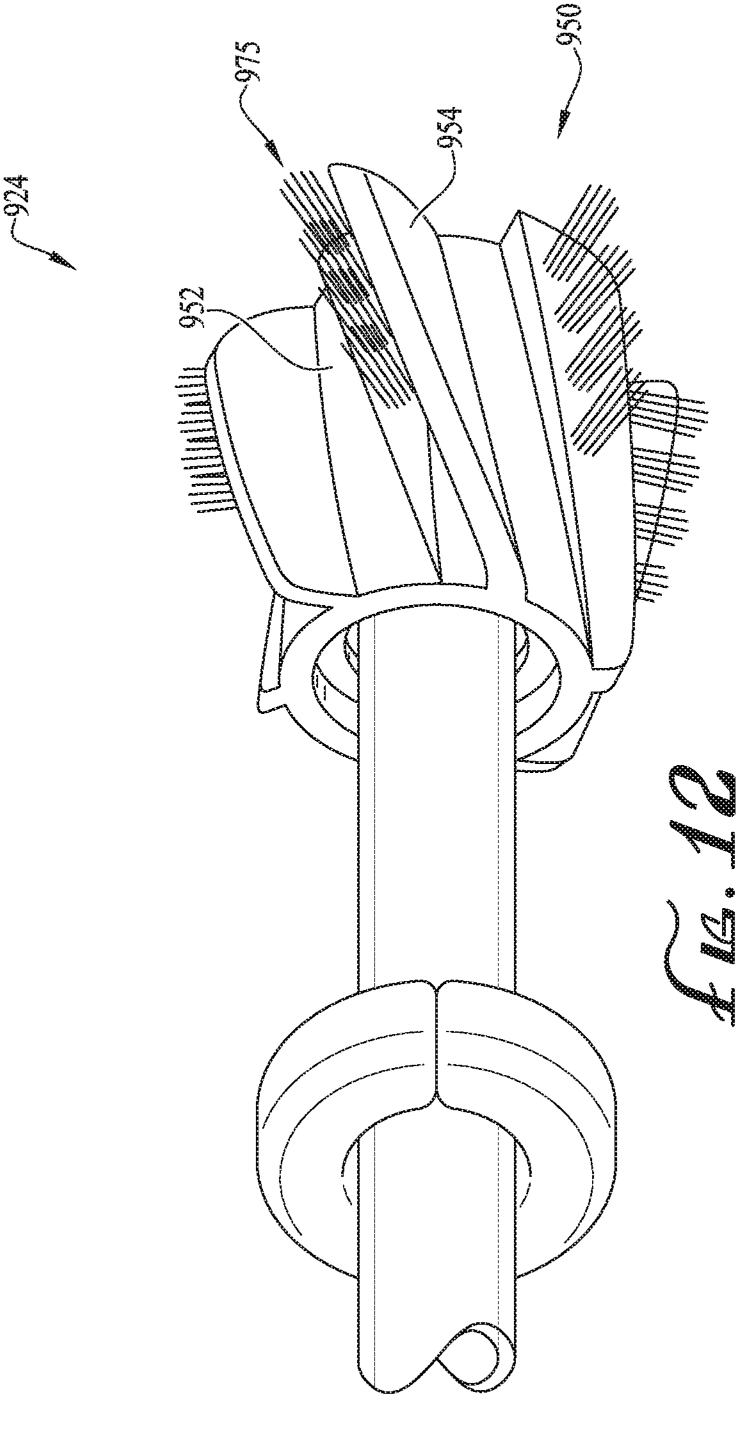
FIG. 12 shows a tail sweep diffuser nozzle for a pool cleaner, according to another example embodiment of the invention.

FIG. 12 shows a spinning diffuser 924 according to another example embodiment of the present invention. The spinning diffuser 924 is similar to the above described embodiments, including a dissipating portion 950 comprising a sleeve 952 with a plurality of pitched or helical blades 954 extending outwardly therefrom. A flexible resilient brushing material 975 is affixed at the distal edges of the blades 954, for example to provide improved cleaning of pool surfaces during use, reduced impact or abrasion on pool surfaces, and/or for increased product life. In example embodiments, the brushing material 975 can be formed from a plurality of strands of a firm material, such as nylon, polyester, polyethylene, or carbon fiber. In other embodiments, strips or blades of a resilient, flexible material such as rubber or silicon can be used. The brush material 975 is positioned to extend beyond the external pitched blades 954 on the dissipating portion 950. As the dissipating portion 950 spins, the brush material 975 can contact the bottom or sides of the pool to dislodge and agitate dirt and debris.

Figure 13A:
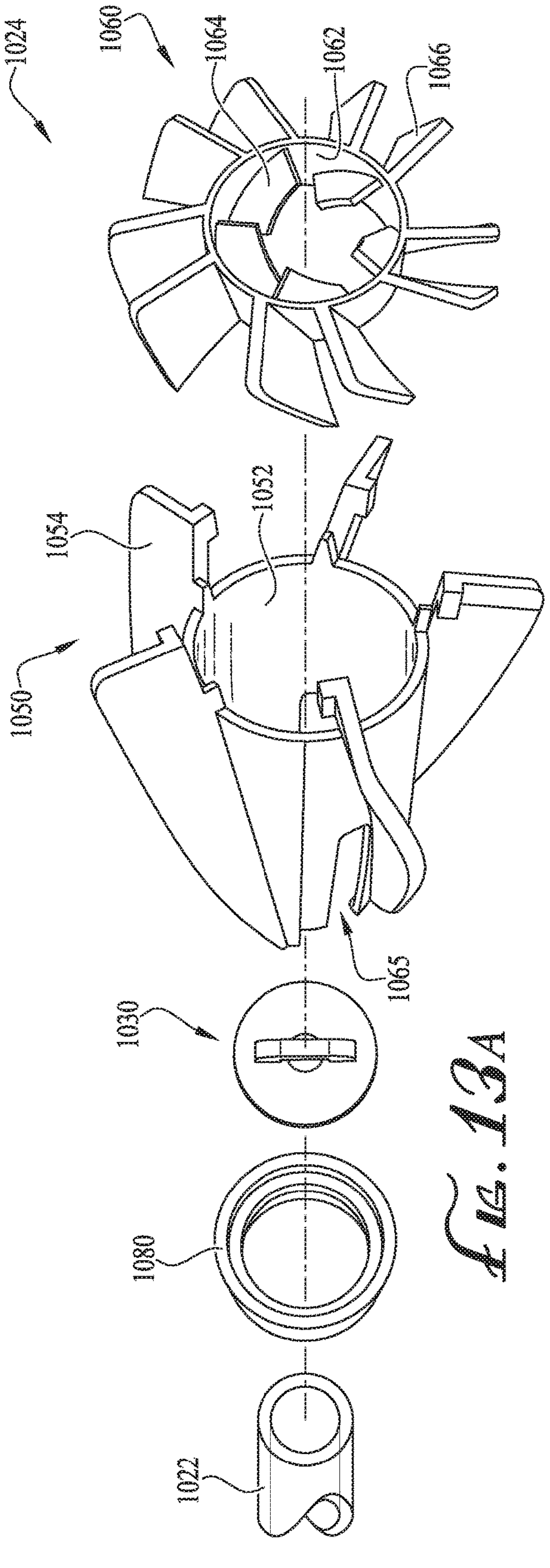
FIGS. 13A and 13B show a tail sweep diffuser nozzle for a pool cleaner, according to another example embodiment of the invention.
Figure 13B:
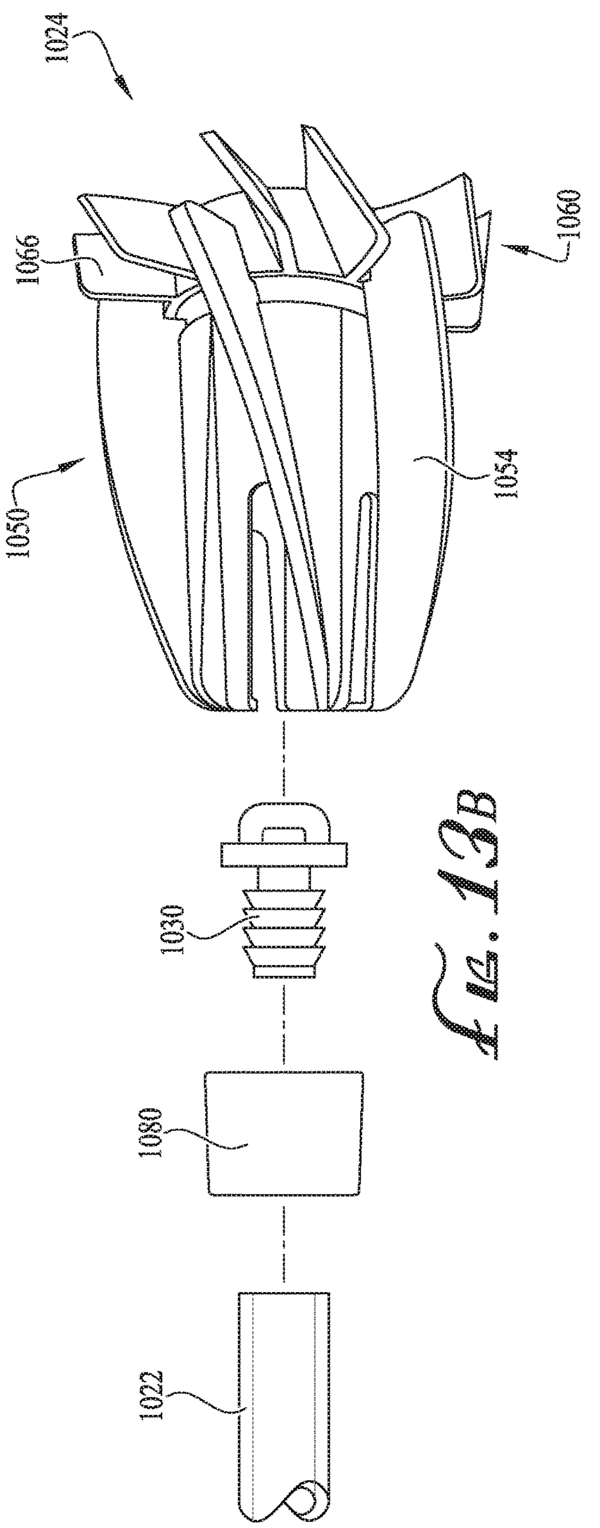

FIGS. 13A and 13B show a spinning diffuser 1024 according to another example embodiment of the present invention. The spinning diffuser 1024 includes a flow shaping nozzle 1030 for engagement in the end of the tail sweep hose 1022, a spinning dissipating portion 1050 configured to mount over the shaping nozzle, and a retaining cap 1080 to retain the shaping nozzle in place in the hose and/or to serve as a bearing or bushing for rotational support of the dissipating portion. The dissipating portion 1050 includes a sleeve 1052 with a plurality of pitched or helical blades 1054 extending outwardly from an exterior surface thereof. The dissipating portion 1050 also includes an impeller portion 1060 comprising an annular collar 1062 having a plurality of helical or pitched inner impeller blades or fins 1064 extending inwardly from an interior surface of the collar, and a plurality of helical or pitched outer brushing blades or fins 1066 extending outwardly from an exterior surface of the collar. The inner impeller blades 1064 transfer energy from the pressurized stream of water from the tail sweep hose 1022 as it passes through the diffuser to assist in driving the spinning motion of the dissipating portion 1050. The outer brushing fins 1066 optionally extend radially outward beyond the periphery of the blades 1054 for increased contact with pool surfaces for improved cleaning, and optionally also increase the spinning effect as the tail sweep moves through the water. Optionally, the impeller portion 1060 is formed from silicone, rubber, or other flexible material. In example embodiments, the impeller portion 1060 is coupled to the body of the dissipating portion 1050 by clips or snap couplings on the sleeve 1052 and/or the blades 1054, adhesive, fasteners, or other attachment means; or alternatively may be integrally formed therewith.

Figure 14A:
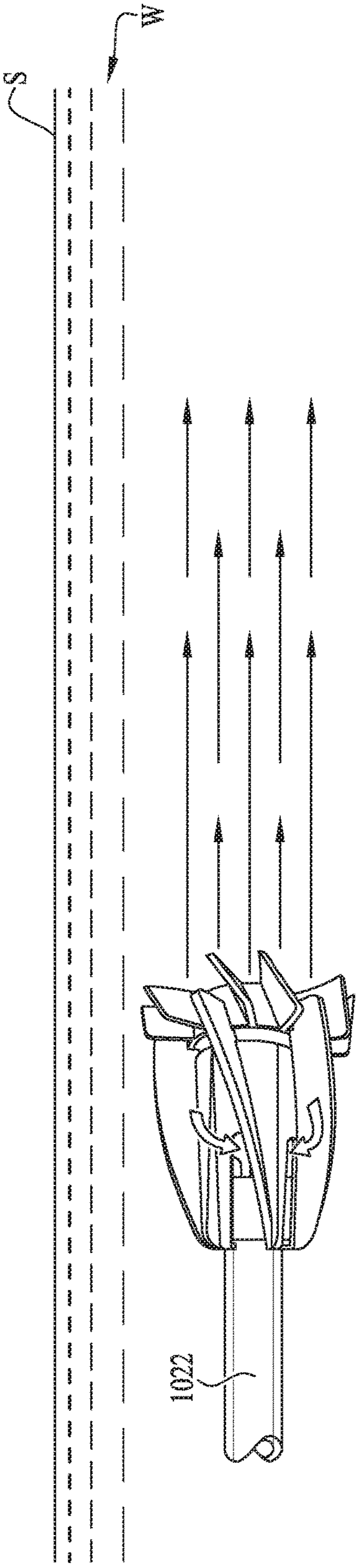
FIGS. 14A and 14B show example flow patterns discharged through a tail sweep diffuser nozzle when submerged below a water surface and above the water surface.
Figure 14B:
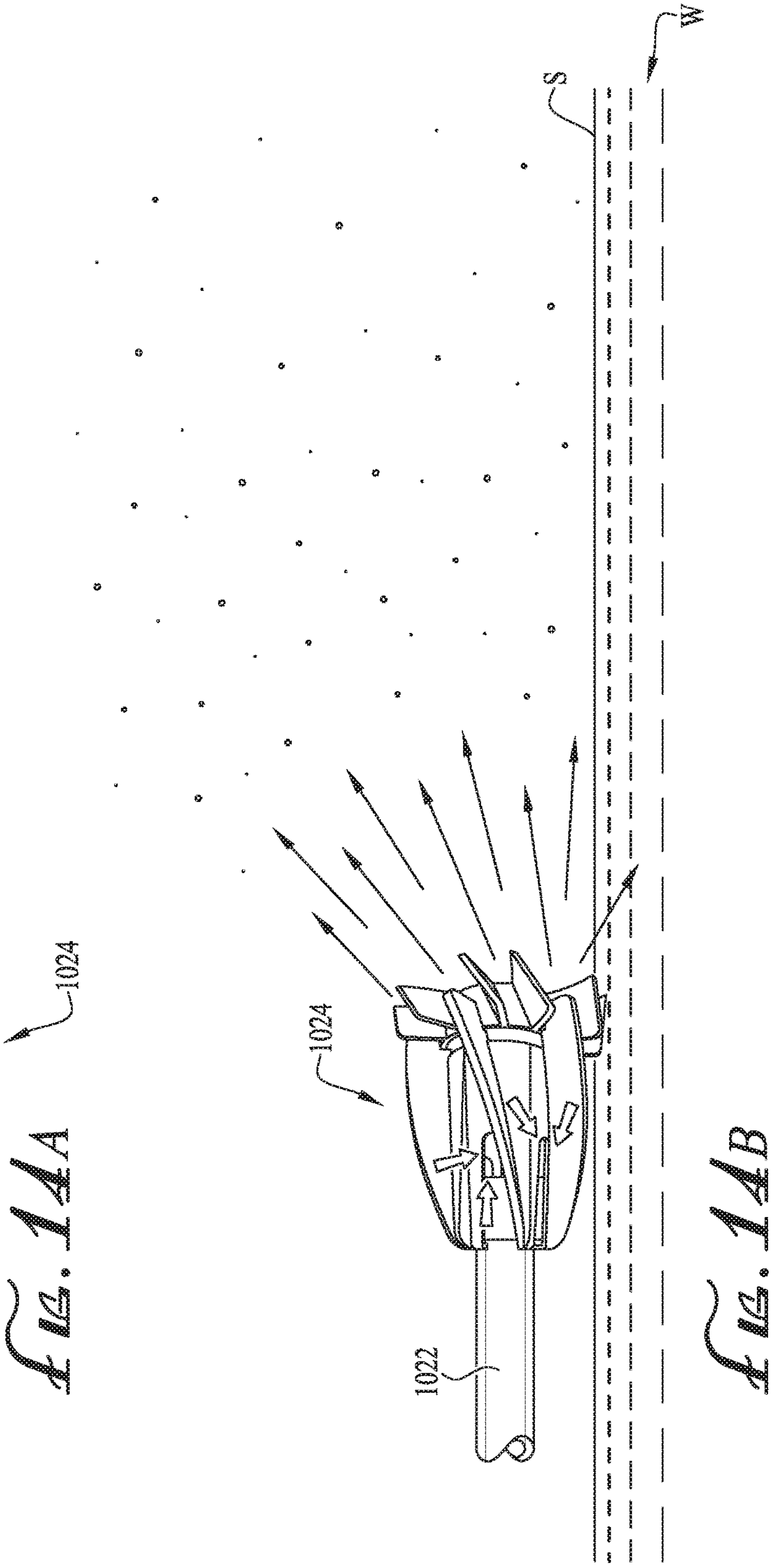

In operation, and in similar fashion to the above described embodiments, the diffuser 1024 generates a more concentrated pressurized stream of water for improved cleaning and movement of the tail sweep when the diffuser is submerged in water W below the surface S of a pool (FIG. 14A), but forms a more diffuse mist or spray when the diffuser moves above the surface of the water (FIG. 14B) to reduce or prevent water being sprayed out of the pool. When the diffuser 1024 is submerged, the ambient water pressure prevents wide divergence of the stream of water delivered from the tail sweep hose 1022, and discharges the pressurized stream of water out the rear opening of the sleeve 1052 of the diffuser. Also, when the diffuser 1024 is submerged, the Venturi effect draws ambient water into the dissipating portion 1050 through the slots or openings 1065 along the sides of the sleeve 1052, increasing the flow of the discharged stream of water. When the diffuser 1024 is above the surface of the water, the stream of water from the tail sweep hose 1022 diverges more widely due to the flow impediment of the shaping nozzle 1030 and the lack of ambient water pressure surrounding the diffuser, causing the stream of water to impinge upon the inner surfaces of the sleeve 1052 and against the inner impeller blades 1064, dissipating the stream into a mist or more diffuse spray. Also, when the diffuser 1024 is above the water surface, the Venturi effect draws ambient air into the dissipating portion 1050 through the slots or openings 1065 along the sides of the sleeve 1052, increasing the dispersion of the stream of water into a mist or more diffuse spray.

While the invention has been described with reference to example embodiments, it will be understood by those skilled in the art that a variety of modifications, additions, and deletions are within the scope of the invention, as defined by the following claims.

What is claimed is:

1. A diffuser for a pool cleaner tail sweep, the diffuser comprising:

a flow shaping nozzle having a first end comprising an inlet opening for receiving an inlet stream of pressurized water from the pool cleaner tail sweep, a second end comprising an outlet opening for discharging an outlet stream of pressurized water, a fluid conduit extending from the inlet opening to the outlet opening, and an obstruction in the path of the outlet stream of pressurized water, the obstruction configured to shape the outlet stream of pressurized water into an at least partially diverging flow pattern; and a dissipating portion comprising a chamber into which the flow shaping nozzle discharges the at least partially diverging flow pattern, the chamber defining a central conduit extending through the entirety thereof, the dissipating portion comprising at least one dissipation element, and a fluid discharge opening;

wherein the diffuser operates in a first mode when submerged in a pool of water beneath a water surface, whereby the at least partially diverging flow pattern is directed through the fluid discharge opening of the dissipating portion in a concentrated stream in the first mode of operation when submerged in a pool of water beneath a water surface; and wherein the diffuser operates in a second mode when positioned above the water surface, whereby the at least partially diverging flow pattern is directed to the at least one dissipation element of the dissipating portion to form a diffuse stream in the second mode of operation when positioned above the water surface.

2. The diffuser of claim 1, wherein the dissipating portion comprises a generally hollow body having at least one sidewall, and wherein the at least one dissipation element comprises a plurality of openings in the at least one sidewall of the hollow body.

3. The diffuser of claim 2, further comprising a foam cover configured to mount over the hollow body.

4. The diffuser of claim 1, wherein the dissipating portion is configured to operate with a spinning motion relative to the flow shaping nozzle, the spinning motion being rotational about an axis generally aligned with the outlet stream of pressurized water from the flow shaping nozzle.

5. The diffuser of claim 4, wherein the dissipating portion comprises a plurality of helical fins.

6. The diffuser of claim 5, wherein the helical fins project outwardly from the dissipating portion to impart the spinning motion as the pool cleaner tail sweep moves the diffuser through the pool of water.

7. The diffuser of claim 5, wherein the helical fins project inwardly and the spinning motion is at least partially driven by impingement of the outlet stream of pressurized water against the inwardly projecting helical fins.

8. The diffuser of claim 1, wherein the at least one dissipation element of the dissipating portion comprises slots formed in a sidewall portion of the dissipating portion.

9. The diffuser of claim 1, wherein the obstruction in the path of the outlet stream of pressurized water shapes the outlet stream of pressurized water into an at least partially hollow cone-shaped diverging flow pattern.

10. The diffuser of claim 1, wherein the obstruction in the path of the outlet stream of pressurized water shapes the outlet stream of pressurized water into an at least partially hollow fan-shaped diverging flow pattern.

11. The diffuser of claim 1, wherein the first end of the flow shaping nozzle comprises an engagement surface configured to be inserted and engaged within an end of a hose of the pool cleaner tail sweep, and wherein the outlet opening and the obstruction of the flow shaping nozzle are positioned immediately adjacent the end of the hose when the engagement surface of the flow shaping nozzle is inserted and engaged within the end of the hose.

12. The diffuser of claim 11, wherein the obstruction of the flow shaping nozzle is positioned no more than 1" from the end of the hose when the engagement surface of the flow shaping nozzle is inserted and engaged in the hose.

13. A diffuser for a pool cleaner having a tail sweep hose, the diffuser comprising:

- a flow shaping nozzle configured for attachment to an end of the tail sweep hose, the flow shaping nozzle having a first end comprising an inlet opening for receiving an inlet stream of pressurized water from the tail sweep hose, a second end comprising an outlet opening for discharging an outlet stream of pressurized water, a fluid conduit extending from the inlet opening to the outlet opening, and an obstruction in the path of the outlet stream of pressurized water, the obstruction configured to shape the outlet stream of pressurized water into an at least partially diverging flow pattern, and wherein the obstruction is positioned immediately adjacent the end of the tail sweep hose when the flow shaping nozzle is attached to the end of the tail sweep hose; and
- a dissipating portion comprising a chamber into which the flow shaping nozzle discharges the at least partially diverging flow pattern, at least a central portion of the chamber being free from obstruction, the dissipating portion comprising at least one dissipation element, and a fluid discharge opening.

14. The diffuser of claim 13, wherein the diffuser is configured for operation in a first mode when submerged in a pool of water beneath a water surface, whereby the at least partially diverging flow pattern is directed through the fluid discharge opening of the dissipating portion in a concentrated stream in the first mode of operation when submerged in a pool of water beneath a water surface; and wherein the diffuser is configured for operation in a second mode when positioned above the water surface, whereby the at least partially diverging flow pattern is directed to the at least one dissipation element of the dissipating portion to form a diffuse stream in the second mode of operation when positioned above the water surface.

15. The diffuser of claim 13, wherein the dissipating portion comprises a generally hollow body having at least one sidewall, and wherein the at least one dissipation element comprises a plurality of openings in the at least one sidewall of the hollow body.

16. The diffuser of claim 15, further comprising a foam cover configured to mount over the hollow body.

17. The diffuser of claim 13, wherein the dissipating portion is configured to operate with a spinning motion relative to the flow shaping nozzle, the spinning motion being rotational about an axis generally aligned with the outlet stream of pressurized water from the flow shaping nozzle.

18. The diffuser of claim 17, wherein the dissipating portion comprises a plurality of helical fins.

19. The diffuser of claim 18, wherein the helical fins project outwardly from the dissipating portion to impart the spinning motion as the diffuser moves through a pool of water.

20. The diffuser of claim 18, wherein the helical fins project inwardly and the spinning motion is at least partially driven by impingement of the outlet stream of pressurized water against the inwardly projecting helical fins.

21. The diffuser of claim 13, wherein the at least one dissipation element of the dissipating portion comprises slots formed in a sidewall portion of the dissipating portion.

22. The diffuser of claim 13, wherein the obstruction in the path of the outlet stream of pressurized water shapes the outlet stream of pressurized water into an at least partially hollow cone-shaped diverging flow pattern.

23. The diffuser of claim 13, wherein the obstruction in the path of the outlet stream of pressurized water shapes the outlet stream of pressurized water into an at least partially hollow fan-shaped diverging flow pattern.

24. The diffuser of claim 13, wherein the obstruction is positioned no more than about 1" from the end of the tail sweep hose when the flow shaping nozzle is attached to the end of the tail sweep hose.

25. A diffuser for a pool cleaner tail sweep hose, the diffuser comprising:

- a flow shaping nozzle having a first end comprising an inlet opening for receiving an inlet stream of pressurized water from the tail sweep hose, a second end comprising an outlet opening for discharging an outlet stream of pressurized water, a fluid conduit extending from the inlet opening to the outlet opening, and an obstruction in the path of the outlet stream of pressurized water, the obstruction configured to shape the outlet stream of pressurized water into an at least partially diverging flow pattern; and
- a dissipating portion comprising a chamber into which the flow shaping nozzle discharges the at least partially diverging flow pattern, the chamber of the dissipating portion comprising a conduit defined at a central area thereof and extending along the entirety thereof, wherein the dissipating portion operates with a spinning motion relative to the flow shaping nozzle, the spinning motion being rotational about an axis generally aligned with the outlet stream of pressurized water from the flow shaping nozzle.

26. The diffuser of claim 25, wherein the dissipating portion comprises a plurality of helical fins.

27. The diffuser of claim 25, wherein the first end of the flow shaping nozzle is configured for engagement with an end of the tail sweep hose of the pool cleaner tail sweep, and wherein the obstruction of the flow shaping nozzle is positioned immediately adjacent the end of the tail sweep hose when the flow shaping nozzle is engaged with the end of the hose.

28. The diffuser of claim 27, wherein the obstruction of the flow shaping nozzle is positioned no more than 1" from the end of the hose when the flow shaping nozzle is engaged with the hose.

* * * * *